(12) United States Patent
Cheng et al.

(10) Patent No.: US 7,952,324 B2
(45) Date of Patent: May 31, 2011

(54) CONTACT-LESS POWER TRANSFER

(75) Inventors: Lily Ka-Lai Cheng, Quarry Bay (HK); James Westwood Hay, Cambridge (GB); Pilgrim Giles William Beart, Cambridge (GB)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 12/850,158

(22) Filed: Aug. 4, 2010

(65) Prior Publication Data

US 2010/0320963 A1    Dec. 23, 2010

Related U.S. Application Data

(60) Division of application No. 12/730,349, filed on Mar. 24, 2010, which is a division of application No. 12/416,979, filed on Apr. 2, 2009, now Pat. No. 7,714,537, which is a continuation of application No. 10/514,046, filed as application No. PCT/GB03/02030 on May 13, 2003, now Pat. No. 7,525,283, which is a continuation-in-part of application No. 10/326,571, filed on Dec. 20, 2002, now Pat. No. 6,906,495.

(30) Foreign Application Priority Data

| May 13, 2002 | (GB) | ................................. | 0210886.8 |
| Jun. 7, 2002 | (GB) | ................................. | 0213024.3 |
| Oct. 28, 2002 | (GB) | ................................. | 022506.6 |
| Dec. 6, 2002 | (GB) | ................................. | 0228425.5 |

(51) Int. Cl.
*H02J 7/00* (2006.01)
(52) U.S. Cl. ........................................................ 320/108
(58) Field of Classification Search .................... 320/108
See application file for complete search history.

(56) References Cited

U.S. PATENT DOCUMENTS 2,415,688 A    2/1947  Hall, Jr.
(Continued)

FOREIGN PATENT DOCUMENTS

CN    2480996 Y    3/2002
(Continued)

OTHER PUBLICATIONS

Office Action, Japanese Patent Application No. 2004-559903, Mailed Dec. 8, 2009.

(Continued)

*Primary Examiner* — Bot LeDynh
*Assistant Examiner* — M'Baye Diao
(74) *Attorney, Agent, or Firm* — Warner Norcross & Judd LLP

(57) ABSTRACT

There is disclosed a system and method for transferring power without requiring direct electrical conductive contacts. There is provided a primary unit having a power supply and a substantially laminar charging surface having at least one conductor that generates an electromagnetic field when a current flows therethrough and having an charging area defined within a perimeter of the surface, the at least one conductor being arranged such that electromagnetic field lines generated by the at least one conductor are substantially parallel to the plane of the surface or at least subtend an angle of 45° or less to the surface within the charging area; and at least one secondary device including at least one conductor that may be wound about a core. Because the electromagnetic field is spread over the charging area and is generally parallel or near-parallel thereto, coupling with flat secondary devices such as mobile telephones and the like is significantly improved in various orientations thereof.

33 Claims, 24 Drawing Sheets

U.S. PATENT DOCUMENTS

| | | |
|---|---|---|
| 2,967,267 A | 1/1961 | Steinman et al. |
| 3,277,358 A | 10/1966 | Nicholl |
| 3,414,796 A | 12/1968 | Henquet |
| 3,673,334 A | 6/1972 | Turner |
| 3,938,018 A | 2/1976 | Dahl |
| 4,031,449 A | 6/1977 | Trombly |
| 4,255,782 A | 3/1981 | Joyce |
| 4,379,988 A | 4/1983 | Mattatall |
| 4,556,837 A | 12/1985 | Kobayashi et al. |
| 4,611,161 A | 9/1986 | Barker |
| 4,635,560 A | 1/1987 | Ballantyne |
| 4,675,638 A | 6/1987 | Szabo |
| 4,684,869 A | 8/1987 | Kobayashi et al. |
| 4,692,604 A | 9/1987 | Billings |
| 4,714,925 A | 12/1987 | Bartlett |
| 4,836,344 A | 6/1989 | Bolger |
| 4,873,677 A | 10/1989 | Sakamoto et al. |
| 4,912,391 A | 3/1990 | Meadows |
| 5,229,652 A | 7/1993 | Hough |
| 5,264,776 A | 11/1993 | Hulsey |
| 5,293,308 A | 3/1994 | Boys et al. |
| 5,323,099 A | 6/1994 | Bruni et al. |
| 5,367,242 A | 11/1994 | Hulman |
| 5,428,961 A | 7/1995 | Sakakibara et al. |
| 5,455,466 A | 10/1995 | Parks et al. |
| 5,455,467 A | 10/1995 | Young et al. |
| 5,519,262 A | 5/1996 | Wood |
| 5,528,113 A | 6/1996 | Boys et al. |
| 5,536,979 A | 7/1996 | McEachern et al. |
| 5,550,452 A | 8/1996 | Shirai et al. |
| 5,564,537 A | 10/1996 | Shoureshi |
| 5,567,537 A | 10/1996 | Yoshizawa et al. |
| 5,568,036 A | 10/1996 | Hulsey et al. |
| 5,594,317 A | 1/1997 | Yeow et al. |
| 5,621,913 A | 4/1997 | Tuttle et al. |
| 5,734,254 A | 3/1998 | Stephens |
| 5,821,638 A | 10/1998 | Boys et al. |
| 5,821,728 A | 10/1998 | Schwind |
| 5,828,365 A | 10/1998 | Chen |
| 5,949,155 A | 9/1999 | Taumra et al. |
| 5,952,814 A | 9/1999 | Van Lerberghe |
| 5,959,433 A | 9/1999 | Rhode |
| 5,982,139 A | 11/1999 | Parise |
| 6,005,304 A | 12/1999 | Seelig |
| 6,008,622 A | 12/1999 | Nakawatase |
| 6,016,046 A | 1/2000 | Kaite et al. |
| 6,028,413 A | 2/2000 | Brockmann |
| 6,040,680 A | 3/2000 | Toya et al. |
| 6,057,668 A | 5/2000 | Chao |
| 6,100,663 A | 8/2000 | Boys et al. |
| 6,127,799 A | 10/2000 | Krishnan |
| 6,175,461 B1 | 1/2001 | Fukuda et al. |
| 6,208,115 B1 | 3/2001 | Binder |
| 6,288,519 B1 | 9/2001 | Peele |
| 6,316,909 B1 | 11/2001 | Honda et al. |
| 6,323,775 B1 | 11/2001 | Hansson |
| 6,331,744 B1 | 12/2001 | Chen et al. |
| 6,388,548 B1 | 5/2002 | Saito et al. |
| 6,433,492 B1 | 8/2002 | Buonavita |
| 6,489,745 B1 | 12/2002 | Koreis |
| 6,489,899 B1 | 12/2002 | Ely et al. |
| 6,498,455 B2 | 12/2002 | Zink et al. |
| 6,498,456 B2 | 12/2002 | Ettes et al. |
| 6,633,155 B1 | 10/2003 | Liang |
| 6,650,213 B1 | 11/2003 | Sakurai et al. |
| 6,721,540 B1 | 4/2004 | Hayakawa |
| 6,803,744 B1 | 10/2004 | Sabo |
| 6,906,495 B2 | 6/2005 | Cheng et al. |
| 7,164,255 B2 | 1/2007 | Hui |
| 7,239,110 B2 | 7/2007 | Cheng et al. |
| 7,392,068 B2 | 6/2008 | Dayan et al. ................ 455/572 |
| 2001/0045785 A1 | 11/2001 | Chen et al. |
| 2002/0042291 A1 | 4/2002 | Lahteenmaki et al. ....... 455/566 |
| 2002/0099894 A1 | 7/2002 | Kehoe et al. |
| 2003/0030342 A1 | 2/2003 | Chen et al. |
| 2003/0048244 A1 | 3/2003 | Lim et al. |
| 2003/0103039 A1 | 6/2003 | Burr et al. |
| 2003/0128010 A1 | 7/2003 | Hsu |
| 2004/0005915 A1 | 1/2004 | Hunter |
| 2004/0048511 A1 | 3/2004 | Dayan et al. |
| 2004/0054941 A1 | 3/2004 | Seiler et al. |
| 2004/0082369 A1 | 4/2004 | Dayan et al. |
| 2004/0130425 A1 | 7/2004 | Dayan et al. |
| 2004/0131928 A1 | 7/2004 | Dyan et al. |
| 2004/0142726 A1 | 7/2004 | Dyan et al. |
| 2005/0189910 A1 | 9/2005 | Hui |
| 2005/0192062 A1 | 9/2005 | Mickle et al. ................ 455/572 |

FOREIGN PATENT DOCUMENTS

| | | |
|---|---|---|
| DE | 297 06 497 U1 | 5/1997 |
| DE | 196 49 682 C2 | 6/1998 |
| EP | 0 218 142 A2 | 4/1987 |
| EP | 0 218 142 B1 | 4/1987 |
| EP | 0 491 214 A1 | 6/1992 |
| EP | 0491214 | 6/1992 |
| EP | 0 558 316 A1 | 9/1993 |
| EP | 0 800 182 A1 | 10/1997 |
| EP | 1221753 | 7/2002 |
| FR | 2 695 285 | 3/1994 |
| FR | 002695285 | 4/1994 |
| GB | 2008869 | 6/1979 |
| GB | 2 117 579 A | 10/1983 |
| GB | 2117579 | 10/1983 |
| GB | 2 142 480 A | 1/1985 |
| GB | 2 314 470 A | 12/1997 |
| GB | 2314470 | 12/1997 |
| GB | 2 330 461 A | 4/1999 |
| GB | 0210886.8 | 5/2002 |
| GB | 0213024.3 | 6/2002 |
| GB | 0213374.2 | 6/2002 |
| GB | 0225006.6 | 10/2002 |
| GB | 0228425.5 | 12/2002 |
| GB | 2 388 716 A | 11/2003 |
| GB | 2388715 A | 11/2003 |
| GB | 2388716 A | 11/2003 |
| GB | 2 389 720 A | 12/2003 |
| GB | 2389720 | 12/2003 |
| GB | 2389720 A | 12/2003 |
| GB | 2389767 A | 12/2003 |
| GB | 2399466 A | 9/2004 |
| JP | 4682363 | 10/1971 |
| JP | 5 234763 | 9/1993 |
| JP | H06-005231 | 1/1994 |
| JP | 7 37737 | 2/1995 |
| JP | 7-298505 | 11/1995 |
| JP | 08214473 | 8/1996 |
| JP | 09-190938 | 7/1997 |
| JP | H09-190938 | 7/1997 |
| JP | 9-266121 | 10/1997 |
| JP | 09266121 | 10/1997 |
| JP | 11-95922 | 4/1999 |
| JP | 11-98704 | 4/1999 |
| JP | 1195922 | 4/1999 |
| JP | 11-307376 | 11/1999 |
| JP | 2000509955 | 2/2000 |
| JP | 2000-269058 | 9/2000 |
| JP | 2000295796 | 10/2000 |
| JP | 2001060998 | 3/2001 |
| JP | 2001-190029 | 7/2001 |
| JP | 2001352698 | 12/2001 |
| JP | 2002148325 | 5/2002 |
| JP | 2002-262468 | 9/2002 |
| JP | 2002313651 | 10/2002 |
| JP | 2002262468 | 11/2002 |
| JP | 2002-359676 | 12/2002 |
| SE | 8704910 A | 12/1987 |
| SE | 008704910 | 6/1989 |
| WO | WO 94/28560 | 12/1994 |
| WO | 9511544 | 4/1995 |
| WO | WO 96/02879 | 2/1996 |
| WO | 9742695 | 11/1997 |
| WO | WO 97/42695 | 11/1997 |
| WO | WO 98/31073 | 7/1998 |
| WO | 0061400 | 10/2000 |
| WO | WO 00/61400 | 10/2000 |
| WO | 0116995 | 3/2001 |
| WO | WO 01/16995 A1 | 3/2001 |

| | | |
|---|---|---|
| WO | WO 01/27946 A1 | 4/2001 |
| WO | 0178216 | 10/2001 |
| WO | WO 01/78216 A1 | 10/2001 |
| WO | 0195432 | 12/2001 |
| WO | WO 02 095555 A2 | 11/2002 |
| WO | WO 03/075415 A1 | 9/2003 |
| WO | WO 03/075416 A1 | 9/2003 |
| WO | 03096512 A2 | 11/2003 |
| WO | WO 03/096361 A1 | 11/2003 |
| WO | WO 03/096512 A2 | 11/2003 |
| WO | WO 03/105308 A1 | 12/2003 |
| WO | WO 2004/015885 A1 | 2/2004 |
| WO | WO 2004/027656 A1 | 4/2004 |
| WO | WO 2004/036774 A2 | 4/2004 |
| WO | WO 2004/073176 A3 | 8/2004 |

OTHER PUBLICATIONS

Japanese Office Action dated May 12, 2009.

Scott; "Networked Surfaces: A Novel LAN Technology;" Sep. 25, 2002 Dissertation; pp. TOC and 1-184.

Hoffman et al; "Data Transport on the Networked Surface;" Laboratory for Communications Engineering—University of Cambridge.

Scott et al; "Networked Surfaces: A New Concept in Mobile Networking;" Laboratory for Communications Engineering—Cambridge University Engineering Department; Oct. 24, 2001.

Scott et al; "Networked Surfaces: A New Concept in Mobile Networking;" Laboratory for Communications Engineering—Cambridge University Engineering Department.

Hoffman et al; "Location of Mobile Devices Using Networked Surfaces;" Laboratory for Communications Engineering—Cambridge University Engineering Department.

Author Unknown; "Arnold fixed my mousepad charger!!;" http://www.afrotechmods.com/cheap/arnoldpad/arnoldoad.htm.

Hatanaka et al; "Coil Shape in a Desk-Type Contactless Power Station System;" Jan. 24, 2001; pp. 1015-1018; vol. 25, No. 4-2; XP-001179722.

Hatanaka et al; "Excited Comopsition of Primary Side in a Position-Free Contactless Power Station System;" Jan. 17, 2002; pp. 580-584; vol. 26, No. 4; XP009026806.

Hatanaka et al; "Power Transmission of a Desk With a Cord-Free Power Supply;" 1 Sept. 2992; IEEE Transactions on Magnets; pp. 3329-3331; vol. 38, No. 5; XP-002271823.

Hatanaka et al, Coil Shape in a Desk-Type Contactless Power Station System, Magnetics Society of Japan, 2001, vol. 25 No. 4-2.

Arnold fixed my mousepad charger!!, http://www.afrotechmods.com/cheap/arnoldpad/arnoldpad.htm, pp. 1-4, Jun. 17, 2003.

International Search Report for WO2003/096512 from the International Searching Authority, dated Dec. 2, 2003.

Hatanaka et al, Excited Composition of Primary Side in a Position-Free Contactless Power Station System, pp. 580-584, vol. 26, No. 4, 2002.

Sato et al, Stable Energy Transmission to Moving Loads utilizing New CLPS, IEEE Transactions on Magnetics, vol. 32, No. 5, Sep. 1996.

Sato et al, Contactless Energy Transmission to Mobile Loads by CLPS—Test Driving of an EV with Starter Batteries, IEEE Transactions on Magnetics, pp. 4203-4205, vol. 33, No. 5, Sep. 1997.

Murakami et al, Consideration on Cordless Power Station—Contactless Power Transmission System, IEEE Transactions on Magnetics, pp. 5037-5039, vol. 32, No. 5, Sep. 1996.

Hatanaka et al, Power Transmission of a Desk With a Cord-Free Power Supply, IEEE Transactions on Magnetics, pp. 3329-3331, vol. 38, No. 5, Sep. 2002.

Great Britain Search Report for GB 0310956.8, dated Jun. 17, 2003.
Great Britain Search Report for GB 0409705.1, dated Jun. 29, 2004.
Great Britain Search Report for GB 0409709.3, dated Jun. 29, 2004.

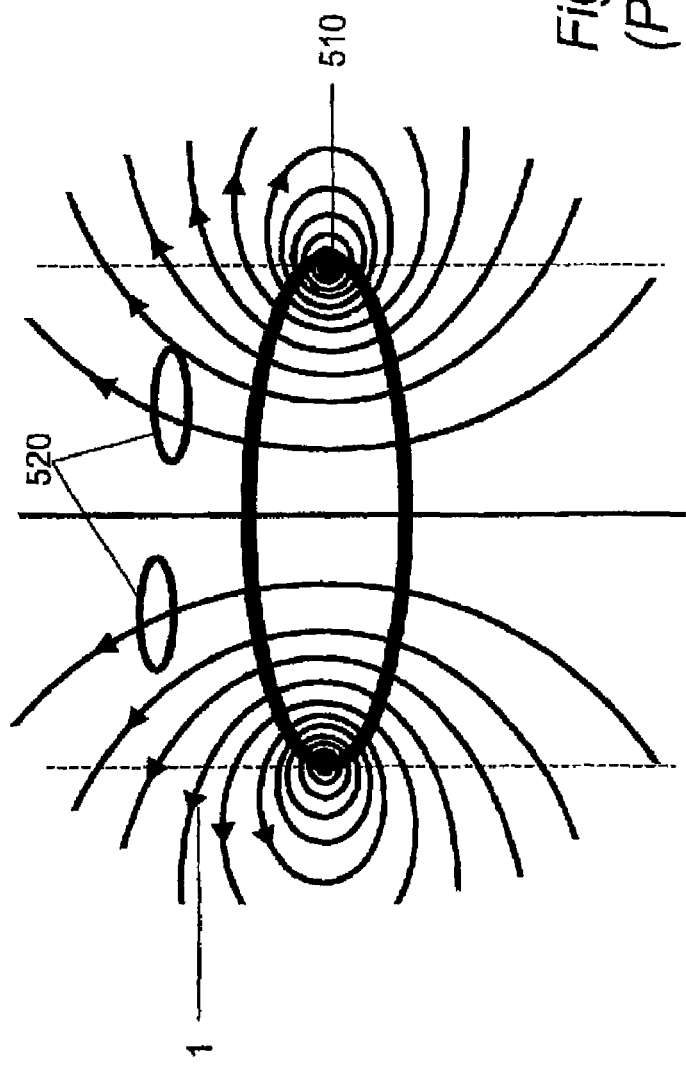
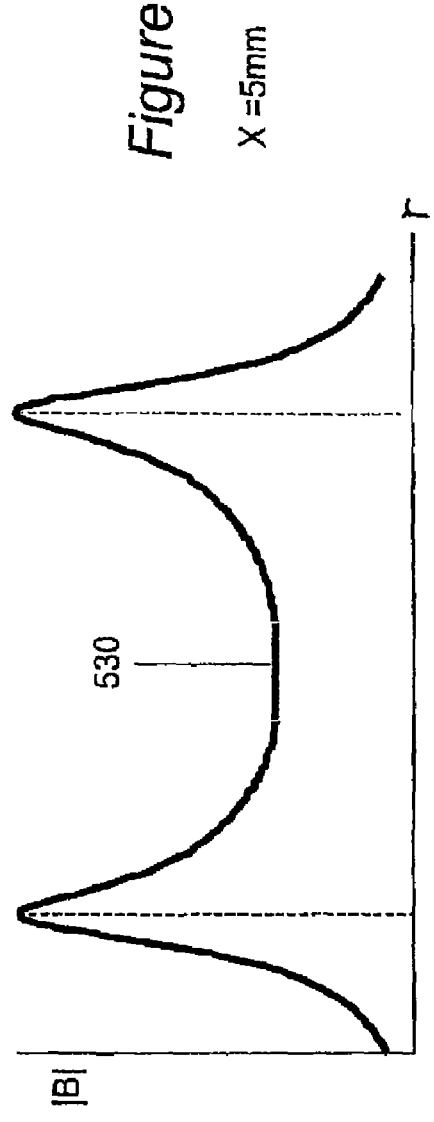
*Figure 2a (Prior Art)*
*Figure 2b*
x =5mm

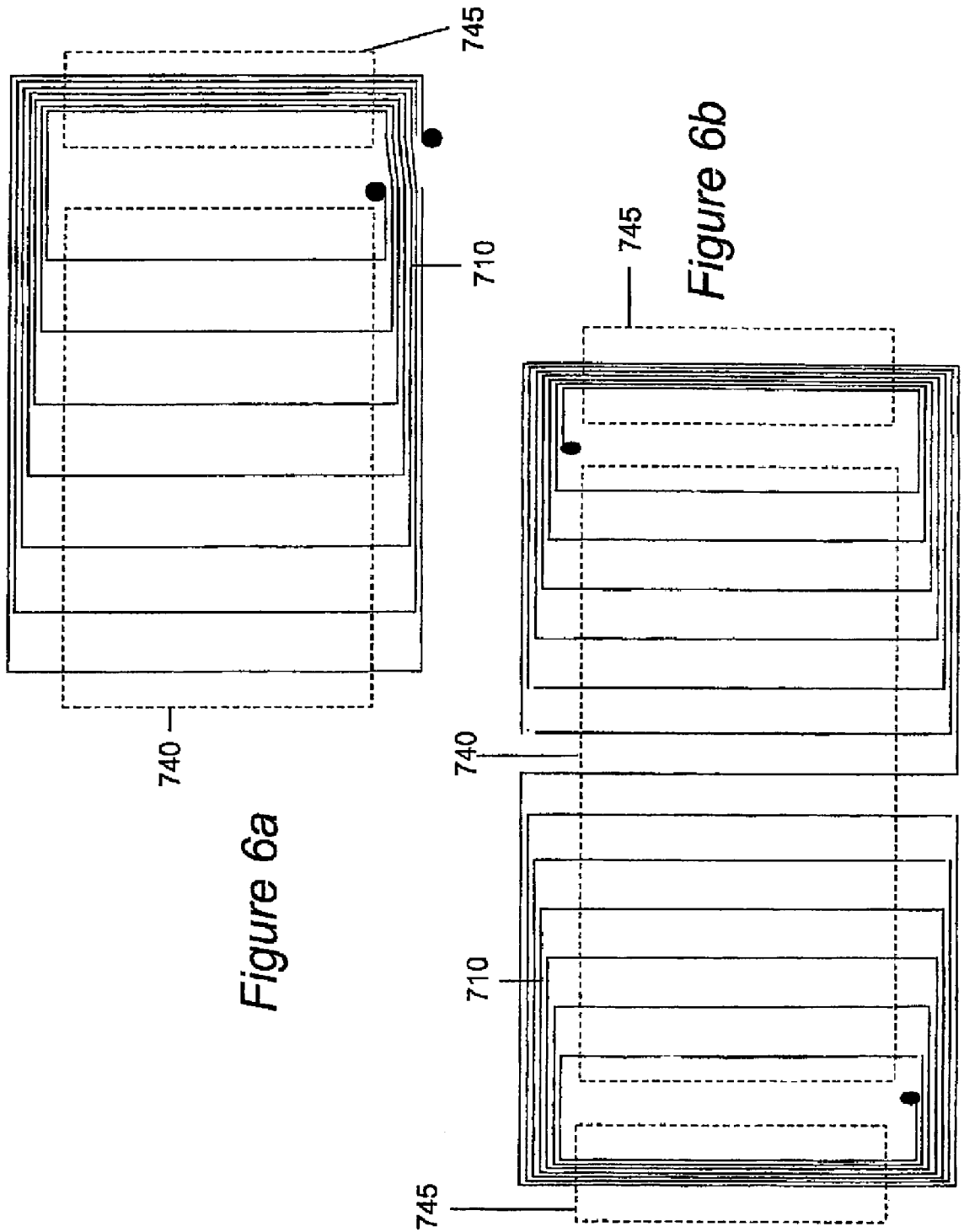

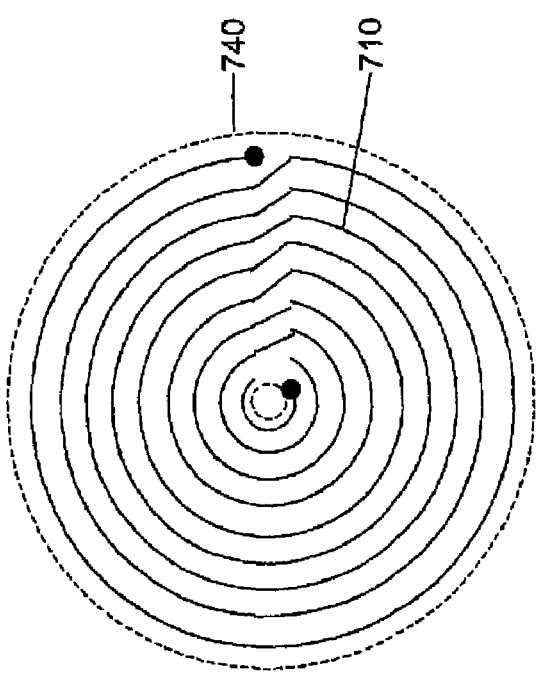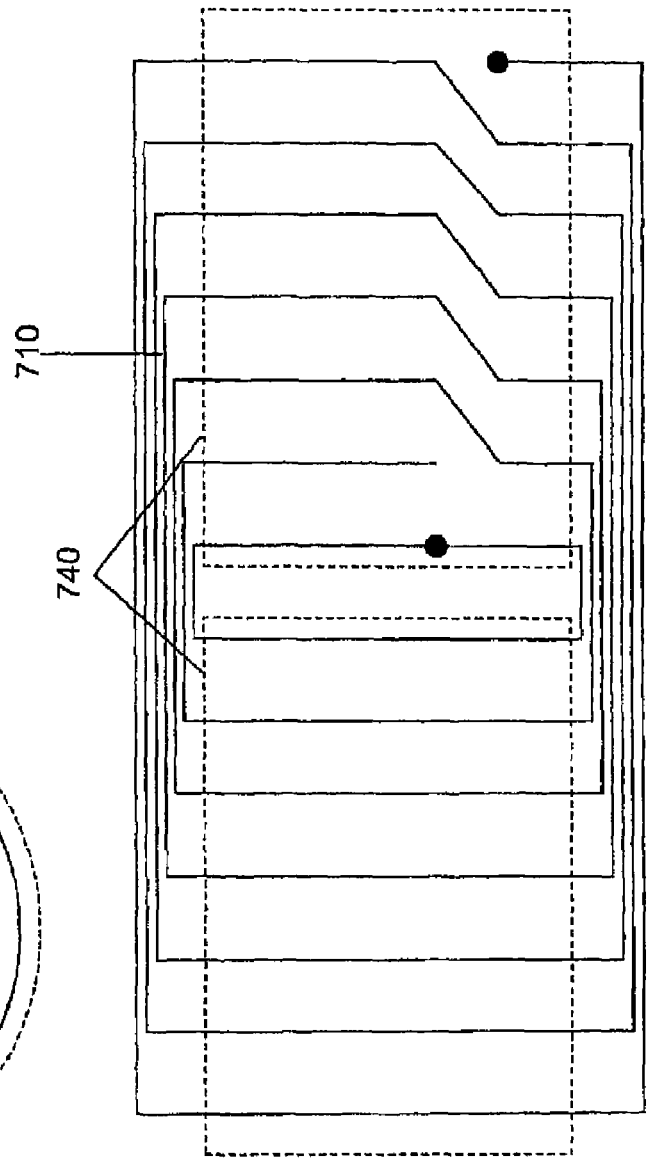
Figure 6c
Figure 6d

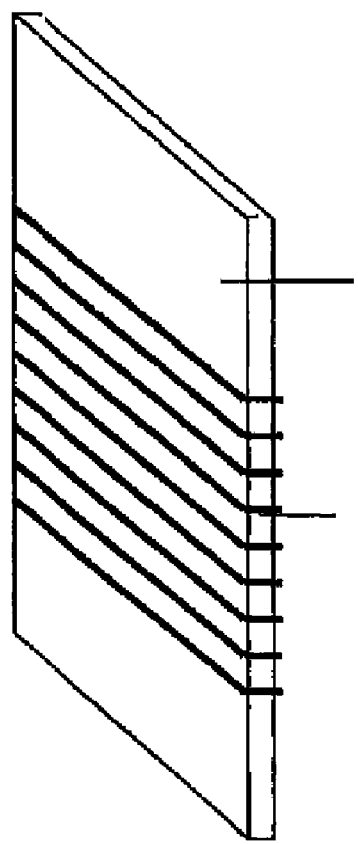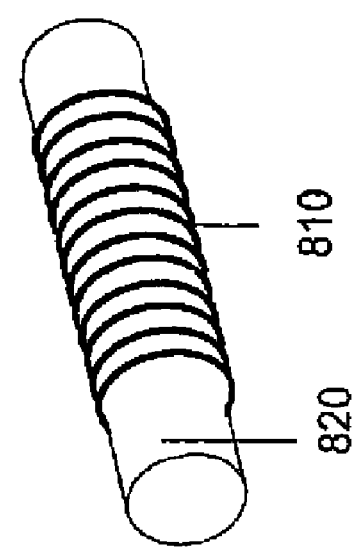
*Figure 7a*
*Figure 7b*

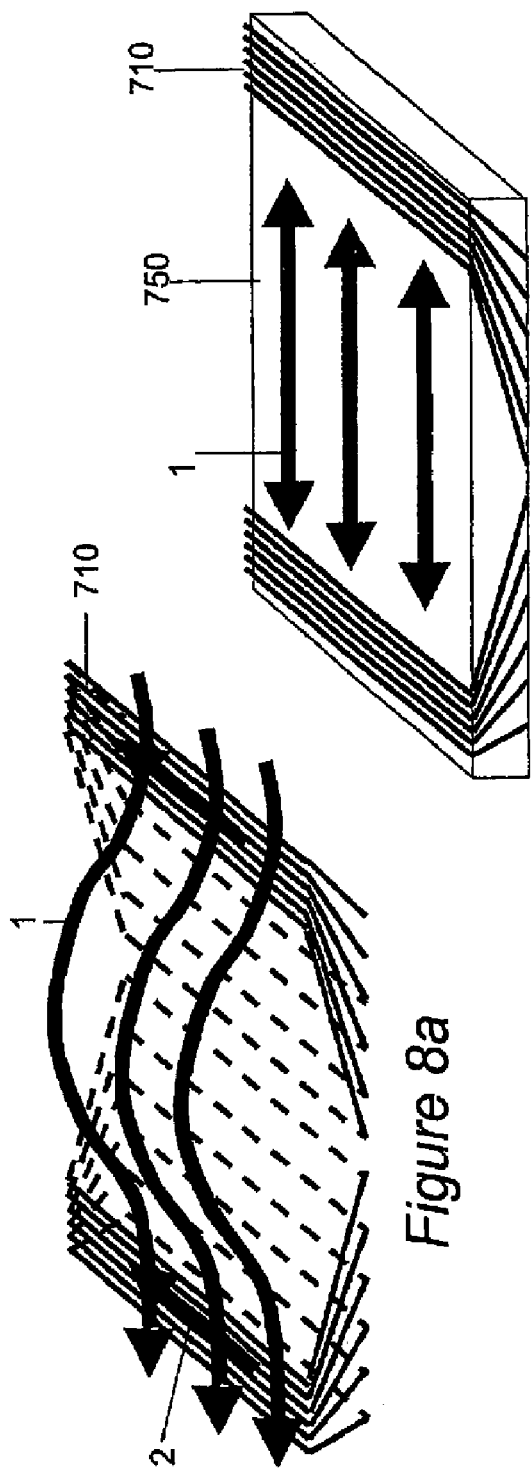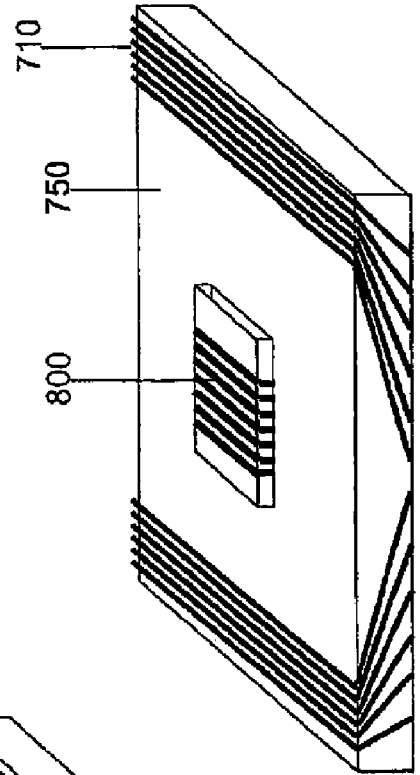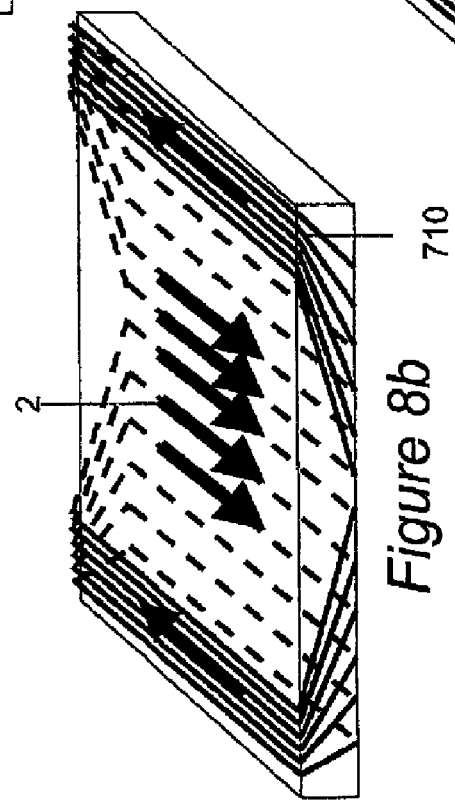
Figure 8a
Figure 8b
Figure 8c
Figure 8d

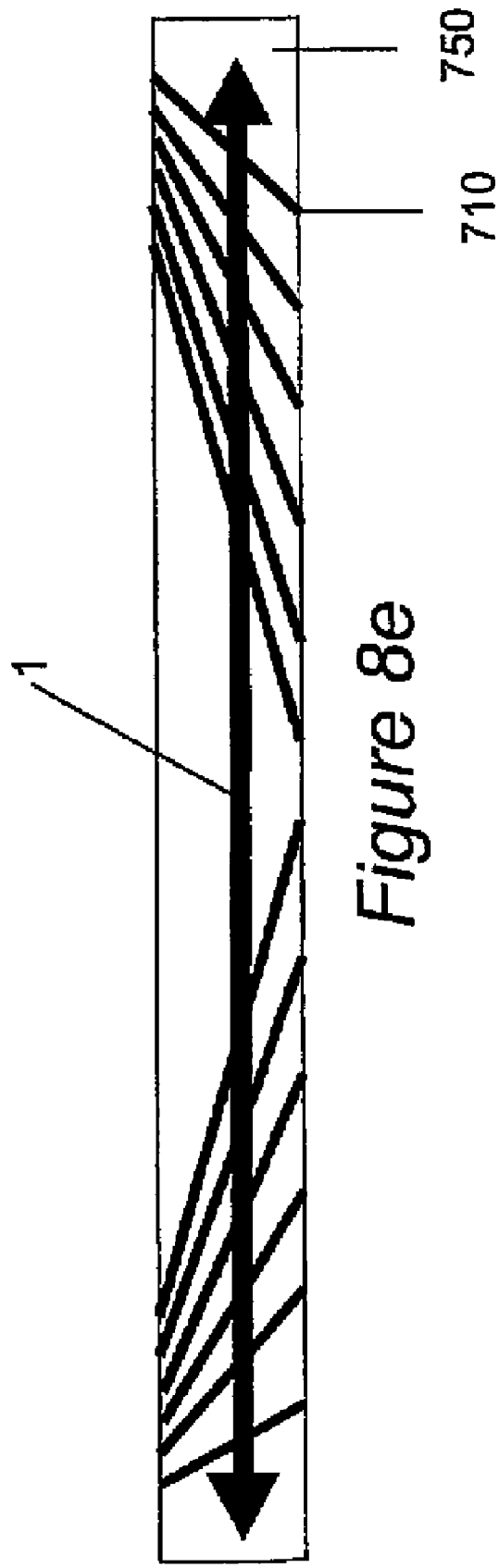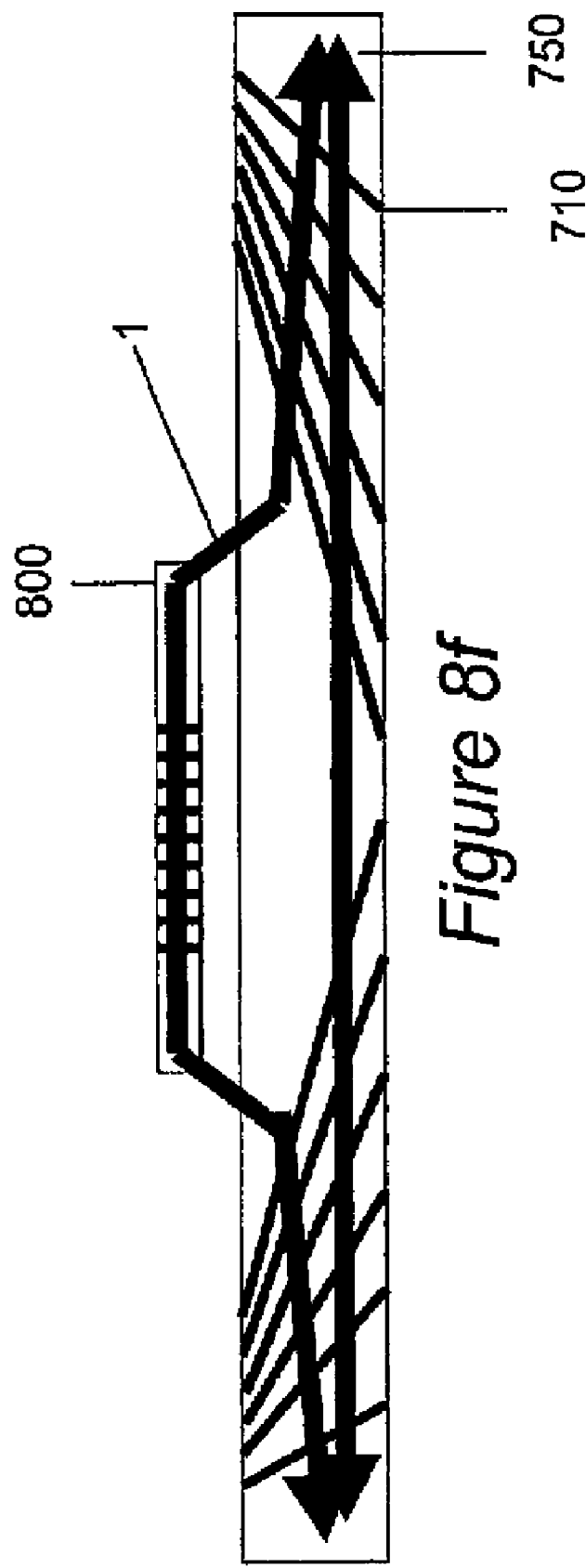

CONTACT-LESS POWER TRANSFER

The present application claims priority from UK patent applications nos 0210886.8 of 13 May 2002, 0213024.3 of 7 Jun. 2002, 0225006.6 of 28 Oct. 2002 and 0228425.5 of 6 Dec. 2002, as well as from U.S. patent application Ser. No. 10/326,571 of 20 Dec. 2002. The full contents of all of these prior patent applications is hereby incorporated into the present application by reference.

This invention relates to a new apparatus and method for transferring power in a contact-less fashion.

Many of today's portable devices incorporate "secondary" power cells which can be recharged, saving the user the cost and inconvenience of regularly having to purchase new cells. Example devices include cellular telephones, laptop computers, the Palm 500 series of Personal Digital Assistants, electric shavers and electric toothbrushes. In some of these devices, the cells are recharged via inductive coupling rather than direct electrical connection. Examples include the Braun Oral B Plak Control power toothbrush, the Panasonic Digital Cordless Phone Solution KX-PH15AL and the Panasonic multi-head men's shavers ES70/40 series.

Each of these devices typically has an adaptor or charger which takes power from mains electricity, a car cigarette lighter or other sources of power and converts it into a form suitable for charging the secondary cells. There are a number of problems associated with conventional means of powering or charging these devices:

Both the characteristics of the cells within each device and the means of connecting to them vary considerably from manufacturer to manufacturer, and from device to device. Therefore users who own several such devices must also own several different adaptors. If users are going away on travel, they will have to bring their collection of chargers if they expect to use their devices during this time.

These adaptors and chargers often require users to plug a small connector into the device or to place the device with accurate alignment into a stand causing inconvenience. If users fail to plug or place their device into a charger and it runs out of power, the device becomes useless and important data stored locally in the device might even be lost.

In addition, most adaptors and chargers have to be plugged into mains sockets and hence if several are used together, they take up space in plug strips and create a messy and confusing tangle of wires.

Besides the above problems with conventional methods of recharging devices, there are also practical problems associated with devices having an open electrical contact. For example, devices cannot be used in wet environments due to the possibility of corroding or shorting out the contacts and also they cannot be used in flammable gaseous environments due to the possibility of creating electrical sparks.

Chargers which use inductive charging remove the need to have open electrical contacts hence allowing the adaptor and device to be sealed and used in wet environments (for example the electric toothbrush as mentioned above is designed to be used in a bathroom). However such chargers still suffer from all other problems as described above. For example, the devices still need to be placed accurately into a charger such that the device and the charger are in a pre-defined relative position (See FIGS. 1a and 1b). The adaptors are still only designed specifically for a certain make and model of device and are still only capable of charging one device at a time. As a result, users still need to possess and manage a collection of different adaptors.

Universal chargers (such as the Maha MH-C777 Plus Universal charger) also exist such that battery packs of different shapes and characteristics can be removed from the device and charged using a single device. Whilst these universal chargers eliminate the need for having different chargers for different devices, they create even more inconvenience for the user in the sense that the battery packs first need to be removed, then the charger needs to be adjusted and the battery pack needs to be accurately positioned in or relative to the charger. In addition, time must be spent to determine the correct pair of battery pack metal contacts which the charger must use.

It is known from U.S. Pat. No. 3,938,018 "Induction charging system" to provide a means for non-contact battery charging whereby an inductive coil on the primary side aligns with a horizontal inductive coil on a secondary device when the device is placed into a cavity on the primary side. The cavity ensures the relatively precise alignment which is necessary with this design to ensure that good coupling is achieved between the primary and secondary coils.

It is also known from U.S. Pat. No. 5,959,433 "Universal Inductive Battery Charger System" to provide a non-contact battery charging system. The battery charger described includes a single charging coil which creates magnetic flux lines which will induce an electrical current in a battery pack which may belong to cellular phones or laptop computers.

It is also known from U.S. Pat. No. 4,873,677 "Charging Apparatus for an Electronic Device" to provide an apparatus for charging an electronic device which includes a pair of coils. This pair of coils is designed to operate in anti-phase such that magnetic flux lines are coupled from one coil to the other. An electronic device such as a watch can be placed on these two coils to receive power.

It is also known from U.S. Pat. No. 5,952,814 "Induction charging apparatus and an electronic device" to provide an induction charger for charging a rechargeable battery. The shape of the external casing of the electronic device matches the internal shape of the charger thus allowing for accurate alignment of the primary and secondary coils.

It is also known from U.S. Pat. No. 6,208,115 "Battery substitute pack" to provide a substitute battery pack which may be inductively recharged.

It is known from WO 00/61400 "Device for Inductively Transmitting Electrical Power" to provide a means of transferring power inductively to conveyors.

It is known from WO 95/11545 "Inductive power pick-up coils" to provide a system for inductive powering of electric vehicles from a series of in-road flat primaries.

To overcome the limitations of inductive power transfer systems which require that secondary devices be axially aligned with the primary unit, one might propose that an obvious solution is to use a simple inductive power transfer system whereby the primary unit is capable of emitting an electromagnetic field over a large area (See FIG. 2a). Users can simply place one or more devices to be recharged within range of the primary unit, with no requirement to place them accurately. For example this primary unit may consist of a coil encircling a large area. When a current flows through the coil, an electromagnetic field extending over a large area is created and devices can be placed anywhere within this area. Although theoretically feasible, this method suffers from a number of drawbacks. Firstly, the intensity of electromagnetic emissions is governed by regulatory limits. This means that this method can only support power transfer at a limited rate. In addition, there are many objects that can be affected by the presence of an intense magnetic field. For example, data stored on credit cards maybe destroyed and objects made of metal will have induced therein eddy currents generating undesired heating effects. In addition, if a secondary device comprising a conventional coil (see FIG. 2a) is placed against a metallic plate such as a copper plane in a printed circuit board or metallic can of a cell, coupling is likely to be significantly reduced.

To avoid the generation of large magnetic fields, one might suggest using an array of coils (Sec FIG. 3) whereby only the coils needed are activated. This method is described in a paper published in the Journal of the Magnetics Society of Japan titled "Coil Shape in a Desk-type Contactless Power Station System" (29 Nov. 2001). In an embodiment of the multiple-coil concept, a sensing mechanism senses the relative location of the secondary device relative to the primary unit. A control system then activates the appropriate coils to deliver power to the secondary device in a localised fashion. Although this method provides a solution to the problems previously listed, it does so in a complicated and costly way. The degree to which the primary field can be localised is limited by the number of coils and hence the number of driving circuits used (i.e. the "resolution" of the primary unit). The cost associated with a multiple-coil system would severely limit the commercial applications of this concept. Non-uniform field distribution is also a drawback. When all the coils are activated in the primary unit, they sum to an equivalent of a large coil, the magnetic field distribution of which is seen to exhibit a minimum at the centre of the coil.

Another scheme is outlined in U.S. Pat. No. 5,519,262 "Near Field Power Coupling System", whereby a primary unit has a number of narrow inductive coils (or alternatively capacitive plates) arranged from one end to the other of a flat plate, creating a number of vertical fields which are driven in a phase-shifted manner so that a sinusoidal wave of activity moves across the plate. A receiving device has two vertical field pickups arranged so that regardless of its position on the plate it can always collect power from at least one pickup. While this scheme also offers freedom of movement of the device, it has the disadvantages of needing a complex secondary device, having a fixed resolution, and having poor coupling because the return flux path is through air.

None of the prior art solutions can satisfactorily address all of the problems that have been described. It would be convenient to have a solution which is capable of transferring power to portable devices with all of the following features and is cost effective to implement:

Universality: a single primary unit which can supply power to different secondary devices with different power requirements thereby eliminating the need for a collection of different adaptors and chargers;

Convenience: a single primary unit which allows secondary devices to be placed anywhere within an active vicinity thereby eliminating the need for plugging-in or placing secondary devices accurately relative to an adaptor or charger;

Multiple-load: a single primary unit that can supply power to a number of secondary different devices with different power requirements at the same time;

Flexibility for use in different environments: a single primary unit that can supply power to secondary devices such that no direct electrical contact is required thereby allowing for secondary devices and the primary unit itself to be used in wet, gaseous, clean and other atypical environments;

Low electromagnetic emissions: a primary unit that can deliver power in a manner that will minimize the intensity and size of the magnetic field generated.

It is further to be appreciated that portable appliances are proliferating and they all need batteries to power them. Primary cells, or batteries of them, must be disposed of once used, which is expensive and environmentally unfriendly. Secondary cells or batteries can be recharged and used again and again.

Many portable devices have receptacles for cells of an industry-standard size and voltage, such as AA, AAA, C, D and PP3. This leaves the user free to choose whether to use primary or secondary cells, and of various types. Once depleted, secondary cells must typically be removed from the device and placed into a separate recharging unit. Alternatively, some portable devices do have recharging circuitry built-in, allowing cells to be recharged in-situ once the device is plugged-in to an external source of power.

It is inconvenient for the user to have to either remove cells from the device for recharging, or to have to plug the device into an external power source for recharging in-situ. It would be far preferable to be able to recharge the cells without doing either, by some non-contact means.

Some portable devices are capable of receiving power coupled inductively from a recharger, for example the Braun Oral B Plak Control toothbrush. Such portable devices typically have a custom, dedicated power-receiving module built-in to the device, which then interfaces with an internal standard cell or battery (which may or may not be removable).

However it would be convenient if the user could transform any portable device which accepts industry-standard cell sizes into an inductively-rechargeable device, simply by fitting inductively-rechargeable cells or batteries, which could then be recharged in-situ by placing the device onto an inductive recharger.

Examples of prior art include U.S. Pat. No. 6,208,115, which discloses a substitute battery pack which may be inductively recharged.

According to a first aspect of the present invention, there is provided a system for transferring power without requiring direct electrical conductive contacts, the system comprising:

i) a primary unit including a substantially laminar charging surface and at least one means for generating an electromagnetic field, the means being distributed in two dimensions across a predetermined area in or parallel to the charging surface so as to define at least one charging area of the charging surface that is substantially coextensive with the predetermined area, the charging area having a width and a length on the charging surface, wherein the means is configured such that, when a predetermined current is supplied thereto and the primary unit is effectively in electromagnetic isolation, an electromagnetic field generated by the means has electromagnetic field lines that, when averaged over any quarter length part of the charging area measured parallel to a direction of the field lines, subtend an angle of 45° or less to the charging surface in proximity thereto and are distributed in two dimensions thereover, and wherein the means has a height measured substantially perpendicular to the charging area that is less than either of the width or the length of the charging area; and ii) at least one secondary device including at least one electrical conductor;

wherein, when the at least one secondary device is placed on or in proximity to a charging area of the primary unit, the electromagnetic field lines couple with the at least one conductor of the at least one secondary device and induce a current to flow therein.

According to a second aspect of the present invention, there is provided a primary unit for transferring power without requiring direct electrical conductive contacts, the primary unit including a substantially laminar charging surface and at least one means for generating an electromagnetic field, the means being distributed in two dimensions across a predetermined area in or parallel to the charging surface so as to define at least one charging area of the charging surface that is substantially coextensive with the predetermined area, the charging area having a width and a length on the charging surface, wherein the means is configured such that, when a predetermined current is supplied thereto and the primary unit is effectively in electromagnetic isolation, an electromagnetic field generated by the means has electromagnetic field lines that, when averaged over any quarter length part of the charging area measured parallel to a direction of the field lines, subtend an angle of 45° or less to the charging surface in proximity thereto and are distributed in two dimensions thereover, and wherein the means has a height measured substantially perpendicular to the charging area that is less than either of the width or the length of the charging area.

According to a third aspect of the present invention, there is provided a method of transferring power in a non-conductive manner from a primary unit to a secondary device, the primary unit including a substantially laminar charging surface and at least one means for generating an electromagnetic field, the means being distributed in two dimensions across a predetermined area in or parallel to the charging surface so as to define at least one charging area of the charging surface that is substantially coextensive with the predetermined area, the charging area having a width and a length on the charging surface, the means having a height measured substantially perpendicular to the charging area that is less than either of the width or the length of the charging area, and the secondary device having at least one electrical conductor; wherein:

i) an electromagnetic field, generated by the means when energised with a predetermined current and measured when the primary unit is effectively in electromagnetic isolation, has electromagnetic field lines that, when averaged over any quarter length part of the charging area measured parallel to a direction of the field lines, subtend an angle of 45° or less to the charging surface in proximity thereto and are distributed in two dimensions over the at least one charging area when averaged thereover; and ii) the electromagnetic field links with the conductor of the secondary device when this is placed on or in proximity to the charging area.

According to a fourth aspect of the present invention, there is provided a secondary device for use with the system, unit or method of the first, second or third aspects, the secondary device including at least one electrical conductor and having a substantially laminar form factor.

In the context of the present application, the word "laminar" defines a geometry in the form of a thin sheet or lamina. The thin sheet or lamina may be substantially flat, or may be curved.

The primary unit may include an integral power supply for the at least one means for generating an electromagnetic field, or may be provided with connectors or the like enabling the at least one means to be connected to an external power supply.

In some embodiments, the means for generating the electromagnetic field have a height that is no more than half the width or half the length of the charging area; in some embodiments, the height may be no more than 1/3 of the width or 1/3 of the length of the charging area.

The at least one electrical conductor in the secondary device may be wound about a core that serves to concentrate flux therein. In particular, the core (where provided) may offer a path of least resistance to flux lines of the electromagnetic field generated by the primary unit. The core may be amorphous magnetically permeable material. In some embodiments, there is no need for an amorphous core.

Where an amorphous core is provided, it is preferred that the amorphous magnetic material is a non-annealed or substantially as-cast state. The material may be at least 70% non-annealed, or preferably at least 90% non-annealed. This is because annealing tends to make amorphous magnetic materials brittle, which is disadvantageous when contained in a device, such as a mobile phone, which may be subjected to rough treatment, for example by being accidentally dropped. In a particularly preferred embodiment, the amorphous magnetic material is provided in the form of a flexible ribbon, which may comprise one or more layers of one or more of the same or different amorphous magnetic materials. Suitable materials include alloys which may contain iron, boron and silicon or other suitable materials. The alloy is melted and then cooled so rapidly ("quenched") that there is no time for it to crystallise as it solidifies, thus leaving the alloy in a glass-like amorphous state. Suitable materials include Metglas® 2714A and like materials. Permalloy or mumetal or the like may also be used.

The core in the secondary device, where provided, is preferably a high magnetic permeability core. The relative permeability of this core is preferably at least 100, even more preferably at least 500, and most preferably at least 1000, with magnitudes of at least 10,000 or 100,000 being particularly advantageous.

The at least one means for generating an electromagnetic field may be a coil, for example in the form of a length of wire or a printed strip, or, may be in the form of a conductive plate of appropriate configuration, or may comprise any appropriate arrangement of conductors. A preferred material is copper, although other conductive materials, generally metals, may be used as appropriate. It is to be understood that the term "coil" is here intended to encompass any appropriate electrical conductor forming an electrical circuit through which current may flow and thus generate an electromagnetic field. In particular, the "coil" need not be wound about a core or former or the like, but may be a simple or complex loop or equivalent structure.

Preferably, the charging area of the primary unit is large enough to accommodate the conductor and/or core of the secondary device in a plurality of orientations thereof. In a particularly preferred embodiment, the charging area is large enough to accommodate the conductor and/or core of the secondary device in any orientation thereof. In this way, power transfer from the primary unit to the secondary device may be achieved without having to align the conductor and/or core of the secondary device in any particular direction when placing the secondary device on the charging surface of the primary unit.

The substantially laminar charging surface of the primary unit may be substantially planar, or may be curved or otherwise configured to fit into a predetermined space, such as a glove compartment of a car dashboard or the like. It is particularly preferred that the means for generating an electromagnetic field does not project or protrude above or beyond the charging surface.

A key feature of the means for generating an electromagnetic field in the primary unit is that electromagnetic field lines generated by the means, measured when the primary unit is effectively in magnetic isolation (i.e. when no secondary device is present on or in proximity to the charging surface), are distributed in two dimensions over the at least one charging area and subtend an angle of 45° or less to the charging area in proximity thereto (for example, less than the height or width of the charging area) and over any quarter length part of the charging area measured in a direction generally parallel to that of the field lines. The measurement of the field lines in this connection is to be understood as a measurement of the field lines when averaged over the quarter length of the charging area, rather than an instantaneous point measurement. In some embodiments, the field lines subtend an angle of 30° or less, and in some embodiments are substantially parallel to at least a central part of the charging area in question. This is in stark contrast to prior art systems, where the field lines tend to be substantially perpendicular to a surface of a primary unit. By generating electromagnetic fields that are more or less parallel to or at least have a significant resolved component parallel to the charging area, it is possible to control the field so as to cause angular variations thereof, in or parallel to the plane of the charging area, that help to avoid any stationary nulls in the electromagnetic field that would otherwise reduce charging efficiency in particular orientations of the secondary device on the charging surface. The direction of the field lines may be rotated through a complete or partial circle, in one or both directions. Alternatively, the direction may be caused to "wobble" or fluctuate, or may be switched between two or more directions. In more complex configurations, the direction of the field lines may vary as a Lissajous pattern or the like.

In some embodiments, the field lines may be substantially parallel to each other over any given charging area, or at least have resolved components in or parallel to the plane of the charging area that are substantially parallel to each other at any given moment in time.

It is to be appreciated that one means for generating an electromagnetic field may serve to provide a field for more than one charging area; also that more than one means may serve to provide a field for just one charging area. In other words, there need not be a one-to-one correspondence of means for generating electromagnetic fields and charging areas.

The secondary device may adopt a substantially flat form factor with a core thickness of 2 mm or less. Using a material such as one or more amorphous metal sheets, it is possible to have core thickness down to 1 mm or less for applications where size and weight is important. See FIG. 7a.

In a preferred embodiment, the primary unit may include a pair of conductors having adjacent coplanar windings which have mutually substantially parallel linear sections arranged so as to produce a substantially uniform electromagnetic field extending generally parallel to or subtending an angle of 45° or less to the plane of the windings but substantially at right angles to the parallel sections.

The windings in this embodiment may be formed in a generally spiral shape, comprising a series of turns having substantially parallel straight sections.

Advantageously, the primary unit may include first and second pairs of conductors which are superimposed in substantially parallel planes with the substantially parallel linear sections of the first pair arranged generally at right angles to the substantially parallel linear sections of the second pair, and further comprising a driving circuit which is arranged to drive them in such a way as to generate a resultant field which rotates in a plane substantially parallel to the planes of the windings.

According to a fifth aspect of the present invention, there is provided a system for transferring power in a contact-less manner consisting of:

a primary unit consisting of at least one electrical coil whereby each coil features at least one active area whereby two or more conductors are substantially distributed over this area in such a fashion that it is possible for a secondary device to be placed in proximity to a part of this active area where the net instantaneous current flow in a particular direction is substantially non-zero;

at least one secondary device consisting of conductors wound around a high permeability core in such a fashion that it is possible for it to be placed in proximity to an area of the surface of the primary unit where the net instantaneous current flow is substantially non-zero;

whereby the at least one secondary device is capable of receiving power by means of electromagnetic induction when the central axis of the winding is in proximity to the active area of the primary unit, is substantially not perpendicular to the plane of the active area of primary unit and is substantially not parallel to the conductors in the active area of at least one of the coils of the primary unit.

Where the secondary device comprises an inductively rechargeable battery or cell, the battery or cell may have a primary axis and be capable of being recharged by an alternating field flowing in the primary axis of the battery or cell, the battery or cell consisting of:

an enclosure and external electrical connections similar in dimensions to industry-standard batteries or cells an energy-storage means an optional flux-concentrating means a power-receiving means a means of converting the received power to a form suitable for delivery to outside the cell through the external electrical connections, or to recharge the energy storage means, or both.

The proposed invention is a significant departure from the design of conventional inductive power transfer systems. The difference between conventional systems and the proposed system is best illustrated by looking at their respective magnetic flux line patterns. (See FIGS. 2a and 4)

Conventional System: In a conventional system (See FIG. 2a), there is typically a planar primary coil which generates a magnetic field with flux lines coming out of the plane in a perpendicular fashion. The secondary device has typically a round or square coil that encircles some or all of these flux lines.

Proposed system: In the proposed system, the magnetic field travels substantially horizontally across the surface of the plane (see FIG. 4) instead of directly out of the plane as illustrated in FIG. 2a. The secondary device hence may have an elongated winding wound around a magnetic core. See FIGS. 7a and 7b. When the secondary device is placed on the primary unit, the flux lines would be attracted to travel through the magnetic core of the secondary device because it is the lowest reluctance path. This causes the secondary device and the primary unit to be coupled effectively. The secondary core and winding may be substantially flattened to form a very thin component.

In describing the invention, specific terminology will be resorted to for the sake of clarity. However, it is not intended that the invention be limited to the specific terms so selected and it is to be understood that each specific term includes all technical equivalents which operate in a similar manner to accomplish a similar purpose.

It is to be understood that the term "charging area" used in this patent application may refer to the area of the at least one means for generating a field (e.g. one or more conductors in the form of a coil) or an area formed by a combination of primary conductors where the secondary device can couple flux effectively. Some embodiments of this are shown in FIGS. 6a to 6l and 9c as component 740. A feature of a "charging area" is a distribution of conductors over a significant area of the primary unit configured such that it is possible for the at least one means for generating a field to be driven to achieve an instantaneous net flow of flux in one direction. A primary unit may have more than one charging area. One charging area is distinct from another charging area when flux cannot be effectively coupled by the secondary device (such as those shown in FIG. 7a) in any rotation at the boundary.

It is to be understood that the term "coil" used in this patent refers to all conductor configurations which feature a charging area as described above. This includes windings of wire or printed tracks or a plane as shown in FIG. 5e. The conductors may be made of copper, gold, alloys or any other appropriate material.

The present application refers to the rotation of a secondary device in several places. It is to be clarified here that if a secondary device is rotated, the axis of rotation being referred to is the one perpendicular to the plane of the charging area.

This radical change in design overcomes a number of drawbacks of conventional systems. The benefits of the proposed invention include:

- No need for accurate alignment: The secondary device can be placed anywhere on a charging area of the primary unit;
- Uniform coupling: In the proposed invention, the coupling between the primary unit and secondary device is much more uniform over the charging area compared to a conventional primary and secondary coil. In a conventional large coil system (see FIG. 2a), the field strength dips to a minimum at the centre of the coil, in the plane of the coil (see FIG. 2b). This implies that if sufficient power is to be effectively transferred at the centre, the field strength at the minimum has to be above a certain threshold. The field strength at the maximum will then be excessively higher than the required threshold and this may cause undesirable effects.
- Universality: a number of different secondary devices, even those having different power requirements, can be placed within charging areas on the charging surface of the primary unit to receive power simultaneously;
- Increased coupling coefficiency: Optional high permeability magnetic material present in the secondary device increases the induced flux significantly by offering a low reluctance path. This can significantly increase the power transfer.
- Desirable form factor for secondary device: The geometry of the system allows thin sheets of magnetic material (such as amorphous metal ribbons) to be used. This means that secondary devices can have the form factor of a thin sheet, making it suitable to be incorporated at the back of mobile phones and other electronic devices. If magnetic material was to be used in the centre of conventional coils, it is likely to increase the bulkiness of the secondary device.
- Minimised field leakage: When one or more secondary devices are present in the charging area of the primary unit, it is possible to use magnetic material in such a way that more than half of the magnetic circuit is low reluctance magnetic material (see FIG. 4d). This means that more flux flows for a given magneto-motive force (mmf). As the induced voltage is proportional to the rate of change of flux linked, this will increase the power transfer to the secondary device. The fewer and shorter the air gaps are in the magnetic circuit, the less the field will fringe, the closer the flux is kept to the surface of the primary unit and hence leakage is minimized.
- Cost effectiveness: Unlike the multiple-coil design, this solution requires a much simpler control system and fewer components.
- Free axial rotation of secondary device: If the secondary device is thin or optionally even cylindrical (see FIG. 10), it may be constructed such that it continues to couple well to the flux regardless of its rotation about its longest axis. This may in particular be an advantage if the secondary device is a battery cell fitted within another device, when its axial rotation may be difficult to control.
- The magnetic core in the secondary device may be located near other parallel planes of metal within or near the device, for example a copper printed circuit board or aluminium cover. In this case, the performance of embodiments of the present invention is significantly better than that of a conventional core-wound coil because the field lines through a conventional device coil will suffer flux-exclusion if the coil is placed up against the metal plane (because the lines of flux must travel perpendicular to the plane of the coil). Since in embodiments of the present invention the lines of flux travel along the plane of the core, and therefore also of the metal plane, performance is improved. An additional benefit is that the magnetic core in a secondary device of embodiments of the present invention can act as a shield between the electromagnetic field generated by the primary unit and any items (e.g. electrical circuits, battery cells) on the other side of the magnetic core.
- Because its permeability is higher than that of air, the magnetic core of the secondary device of embodiments of the present invention acts to concentrate magnetic flux, thus capturing more flux than would otherwise flow through an equivalent cross-section of air. The size of the core's "shape factor" (the equivalent flux-capturing sphere) is determined to a first-order approximation by the longest planar dimension of the core. Therefore if the core of the secondary device of embodiments of the present invention has planar dimensions with a significantly non-square aspect ratio, for example a 4:1 rectangle instead of a 1:1 square, it will capture proportionally more of any flux travelling parallel to the direction of its longest planar dimension. Therefore if used in devices which have a constrained aspect ratio (for example a long thin device such as a headset or pen), a significant increase in performance will be experienced compared with that of a conventional coil of the same area.

The primary unit typically consists of the following components. (See FIG. 5)

- Power supply: This power supply converts mains voltage into a lower voltage dc supply. This is typically a conventional transformer or a switch-mode power supply;
- Control unit: The control unit serves the function of maintaining the resonance of the circuit given that the inductance of the means for generating a field changes with the presence of secondary devices. To enable this function, the control unit may be coupled to a sensing unit which feeds back the current status of the circuit. It may also be coupled to a library of capacitors which may be switched in and out as required. If the means for generating a field requires more than one driving circuit, the control unit may also coordinate the parameters such as the phase difference or on/off times of different driving circuits such that the desired effect is achieved. It is also possible for the Q (quality factor) of the system to be designed to function over a range of inductances such that a need for the above control system is eliminated;

Driving circuit: The driving unit is controlled by the control unit and drives a changing current through the means for generating a field or a component of the means. More than one driving circuit may be present depending on the number of independent components in the means;

Means for generating an electromagnetic field: The means uses current supplied from the driving circuits to generate electromagnetic fields of pre-defined shapes and intensities. The exact configuration of the means defines the shape and intensity of the field generated. The means may include magnetic material to act as flux guides and also one or more independently driven components (windings), together forming the charging area. A number of embodiment designs are possible and examples are shown in FIG. 6.

Sensing unit: The sensing unit retrieves and sends relevant data to the control unit for interpretation.

The secondary device typically consists of the following components, as shown in FIG. 5.

Magnetic unit: the magnetic unit converts the energy stored in the magnetic field generated by the primary unit back into electrical energy. This is typically implemented by means of a winding wound around a highly permeable magnetic core. The largest dimension of the core typically coincides with the central axis of the winding.

Conversion unit: the conversion unit converts the fluctuating current received from the magnetic unit into a form that is useful to the device that it is coupled to. For example, the conversion unit may convert the fluctuating current into an unregulated dc supply by means of a full-wave bridge rectifier and smoothing capacitor. In other cases, the conversion unit may be coupled to a heating element or a battery charger. There is also typically a capacitor present either in parallel or in series with the magnetic unit to form a resonant circuit at the operating frequency of the primary unit.

In typical operation, one or more secondary devices are placed on top of the charging surface of the primary unit. The flux flows through the at least one conductor and/or core of the secondary devices present and current is induced. Depending on the configuration of the means for generating a field in the primary unit, the rotational orientation of the secondary device may affect the amount of flux coupled.

The Primary Unit

The primary unit may exist in many different forms, for example:

As a flat platform or pad which can sit on top of tables and other flat surfaces;

Built in to furniture such as desks, tables, counters, chairs, bookcases etc. such that the primary unit may not be visible;

As part of an enclosure such as a drawer, a box, a glove compartment of a car, a container for power tools;

As a flat platform or pad which can be attached to a wall and used vertically.

The primary unit may be powered from different sources, for example:

A mains AC power outlet

A vehicle lighter socket

Batteries

Fuel Cells

Solar Panel

Human power

The primary unit may be small enough such that only one secondary device may be accommodated on the charging surface in a single charging area, or may be large enough to accommodate many secondary devices simultaneously, sometimes in different charging areas.

The means for generating a field in the primary unit may be driven at mains frequency (50 Hz or 60 Hz) or at some higher frequency.

The sensing unit of the primary unit may sense the presence of secondary devices, the number of secondary devices present and even the presence of other magnetic material which is not part of a secondary device. This information may be used to control the current being delivered to the field generating means of the primary unit.

The primary unit and/or the secondary device may be substantially waterproof or explosion proof.

The primary unit and/or the secondary device may be hermetically sealed to standards such as IP66.

The primary unit may incorporate visual indicators (for example, but not limited to, light emitting devices, such as light emitting diodes, electrophosphorescent displays, light emitting polymers, or light reflecting devices, such as liquid crystal displays or MITs electronic paper) to indicate the current state of the primary unit, the presence of secondary devices or the number of secondary devices present or any combination of the above.

The Means for Generating an Electromagnetic Field

The field generating means as referred to in this application includes all configurations of conductors where:

The conductors are substantially distributed in the plane and;

Substantial areas of the plane exist where there is a non-zero net instantaneous current flow. These are areas on which, given the correct orientation, the secondary devices will couple effectively and receive power. (See FIG. 6)

The conductors are capable of generating an electromagnetic field where the field lines subtend an angle of 45° or less or are substantially parallel to a substantial area of the plane.

FIG. 6 illustrate some possibilities for such a primary conductor. Although most of the configurations are in fact coil windings, it is to be appreciated that the same effect can also be achieved with conductor planes which are not typically considered to be coils (See FIG. 6*e*). These drawings are typical examples and are non-exhaustive. These conductors or coils may be used in combination such that the secondary device can couple effectively in all rotations whilst on the charging area(s) of the primary unit.

Magnetic Material

It is possible to use magnetic materials in the primary unit to enhance performance.

Magnetic material may be placed below one or more charging areas or the entire charging surface such that there is also a low reluctance path on the underside of the conductors for the flux to complete its path. According to theory, an analogy can be drawn between magnetic circuits and electrical circuits. Voltage is analogous to magneto-motive force (mmf), resistance is analogous to reluctance and current is analogous to flux. From this, it can be seen that for a given mmf, flux flow will increase if the reluctance of the path is decreased. By providing magnetic material to the underside of the charging area, the reluctance of the magnetic circuit is essentially decreased. This substantially increases the flux linked by the secondary device and ultimately increases the power transferred. FIG. 4d illustrates a sheet of magnetic material placed underneath the charging area and the resulting magnetic circuit.

Magnetic material may also be placed above the charging surface and/or charging area(s) and below the secondary devices to act as a flux guide. This flux guide performs two functions: Firstly, the reluctance of the whole magnetic circuit is further decreased allowing more flux to flow. Secondly, it provides a low reluctance path along the top surface of the charging area(s) so the flux lines will flow through these flux guides in favour of flowing through the air. Hence this has the effect of containing the field close to the charging surface of the primary unit instead of in the air. The magnetic material used for flux guides may be strategically or deliberately chosen to have different magnetic properties to the magnetic core (where provided) of the secondary device. For example, a material with lower permeability and higher saturation may be chosen. High saturation means that the material can carry more flux and the lower permeability means that when a secondary device is in proximity, a significant amount of flux would then choose to travel through the secondary device in favour of the flux guide. (See FIG. 8)

In some configurations of the primary unit field generating means, there may be conductors present that do not form part of the charging area, such as the component marked 745 in FIGS. 6a and 6b. In such cases, one may wish to use magnetic material to shield the effects of these conductors.

Examples of some materials which may be used include but are not limited to: amorphous metal (metallic glass alloys such as MetGlas™), mesh of wires made of magnetic material, steel, ferrite cores, mumetal and permalloy.

The Secondary Device

The secondary device may take a variety of shapes and forms. Generally, in order for good flux linkage, a central axis of the conductor (for example, a coil winding) should be substantially non-perpendicular to the charging area(s).

The secondary device may be in the shape of a flattened winding. (See FIG. 7a) The magnetic core inside can consist of sheets of magnetic material such as amorphous metals. This geometry allows the secondary device to be incorporated at the back of electronic devices such as mobile phones, personal digital assistants and laptops without adding bulk to the device.

The secondary device may be in the shape of a long cylinder. A long cylindrical core could be wound with conductors (See FIG. 7b).

The secondary device may be an object with magnetic material wrapped around it. An example is a standard-sized (AA, AAA, C, D) or other sized/shaped (e.g. dedicated/customised for particular applications) rechargeable battery cell with for example magnetic material wrapped around the cylinder and windings around the cylindrical body.

The secondary device may be a combination of two or more of the above. The above embodiments may even be combined with a conventional coil.

The following non-exhaustive list illustrates some examples of objects that can be coupled to a secondary device to receive power. Possibilities are not limited to those described below:

A mobile communication device, for example a radio, mobile telephone or walkie-talkie;

A portable computing device, for example a personal digital assistant or palmtop or laptop computer;

Portable entertainment devices, for example a music player, games console or toy;

Personal care items, for example a toothbrush, shaver, hair curler, hair rollers;

A portable imaging device, for example a video camcorder or a camera;

Containers of contents that may require heating, for example coffee mugs, plates, cooking pots, nail-polish and cosmetic containers;

Consumer devices, for example torches, clocks and fans;

Power tools, for example cordless drills and screwdrivers;

Wireless peripheral devices, for example wireless computer mouse, keyboard and headset;

Time keeping devices, for example clock, wrist watch, stop watch and alarm clock;

A battery-pack for insertion into any of the above;

A standard-sized battery cell.

In the case of unintelligent secondary devices such as a battery cell, some sophisticated charge-control means may also be necessary to meter inductive power to the cell and to deal with situations where multiple cells in a device have different charge states. Furthermore, it becomes more important for the primary unit to be able to indicate a "charged" condition, since the secondary cell or battery may not be easily visible when located inside another electrical device.

A possible system comprising an inductively rechargeable battery or cell and a primary unit is shown in FIG. 10. In addition to the freedom to place the battery 920 freely in (X,Y) and optionally rotate it in rZ, relative to the primary unit 910, the battery can also be rotated along its axis rA while continuing to receive power.

When a user inserts a battery into a portable device, it is not easy to ensure that it has any given axial rotation. Therefore, embodiments of the present invention are highly advantageous because they can ensure that the battery can receive power while in any random orientation about rA.

The battery or cell may include a flux concentrating means that may be arranged in a variety of ways:

1. As shown in FIG. 11a, a cell 930 may be wrapped in a cylinder of flux-concentrating material 931, around which is wrapped a coil of wire 932.
    a. The cylinder may be long or short relative to the length of the cell.
2. As shown in FIG. 11b, a cell 930 may have a portion of flux-concentrating material 931 on its surface, around which is wrapped a coil of wire 932.
    a. The portion may be conformed to the surface of the cell, or embedded within it.
    b. Its area may be large or small relative to the circumference of the cell, and long or short relative to the length of the cell.
3. As shown in FIG. 11c, a cell 930 may contain a portion of flux-concentrating material 931 within it, around which is wrapped a coil of wire 932.
    a. The portion may be substantially flat, cylindrical, rod-like, or any other shape.
    b. Its width may be large or small relative to the diameter of the cell
    c. Its length may be large or small relative to the length of the cell In any of these cases, the flux-concentrator may be a functional part of the battery enclosure (for example, an outer zinc electrode) or the battery itself (for example, an inner electrode).

Issues relating to charging of secondary cells (e.g. AA rechargeable cells in-situ within an appliance include:
  Terminal voltage could be higher than normal.
  Cells in series may behave strangely, particularly in situations where some cells are charged, others not.
  Having to provide enough power to run the device and charge the cell.
  If fast-charging is effected incorrectly, the cells may be damaged.

Accordingly, some sophisticated charge-control means to meter inductive power to the appliance and the cell is advantageously provided. Furthermore, it becomes more important for the primary unit to be able to indicate a "charged" condition, since the secondary cell or battery may not be easily visible when located inside an electrical device.

A cell or battery enabled in this fashion may be charged whilst fitted in another device, by placing the device onto the primary unit, or whilst outside the device by placing the cell or battery directly onto the primary unit.

Batteries enabled in this fashion may be arranged in packs of cells as in typical devices (e.g. end-to-end or side-by-side), allowing a single pack to replace a set of cells.

Alternatively, the secondary device may consist of a flat "adapter" which fits over the batteries in a device, with thin electrodes which force down between the battery electrodes and the device contacts.

Rotating Electromagnetic Field

In the coils such as those in FIGS. 6, 9a and 9b, the secondary devices will generally only couple effectively when the windings are placed substantially parallel to the direction of net current flow in the primary conductor as shown by the arrow 1. In some applications, one might require a primary unit which will transfer power effectively to secondary devices regardless of their rotation as long as:
  the central axis of the secondary conductor is not perpendicular to the plane and;
  the secondary device is in close proximity to the primary unit To enable this, it is possible to have two coils, for example one positioned on top of the other or one woven into or otherwise associated with the other, the second coil capable of generating a net current flow substantially perpendicular to the direction of the first coil at any point in the active area of the primary unit. These two coils may be driven alternately such that each is activated for a certain period of time. Another possibility is to drive the two coils in quadrature such that a rotating magnetic dipole is generated in the plane. This is illustrated in FIG. 9. This is also possible with other combinations of coil configurations.

Resonant Circuits

It is known in the art to drive coils using parallel or series resonant circuits. In series resonant circuits for example, the impedance of the coil and the capacitor are equal and opposite at resonance, hence the total impedance of the circuit is minimised and a maximum current flows through the primary coil. The secondary device is typically also tuned to the operating frequency to maximise the induced voltage or current.

In some systems like the electric toothbrush, it is common to have a circuit which is detuned when the secondary device is not present and tuned when the secondary device is in place. The magnetic material present in the secondary device shifts the self-inductance of the primary unit and brings the circuit into resonance. In other systems like passive radio'tags, there is no magnetic material in the secondary device and hence does not affect the resonant frequency of the system. These tags are also typically small and used far from the primary unit such that even if magnetic material is present, the inductance of the primary is not significantly changed.

In the proposed system, this is not the case:
  High permeability magnetic material may be present in the secondary device and is used in close proximity to the primary unit;
  One or more secondary devices may be brought in close proximity to the primary unit simultaneously.

This has the effect of shifting the inductance of the primary significantly and also to different levels depending on the number of secondary devices present on the pad. When the inductance of the primary unit is shifted, the capacitance required for the circuit to resonant at a particular frequency also changes. There are three methods for keeping the circuit at resonance:
  By means of a control system to dynamically change the operating frequency;
  By means of a control system to dynamically change the capacitance such that resonance is achieved at the predefined frequency;
  By means of a low Q system where the system remains in resonance over a range of inductances.

The problem with changing the operating frequency is that the secondary devices are typically configured to resonate at a predefined frequency. If the operating frequency changes, the secondary device would be detuned. To overcome this problem, it is possible to change the capacitance instead of the operating frequency.

The secondary devices can be designed such that each additional device placed in proximity to the primary unit will shift the inductance to a quantised level such that an appropriate capacitor can be switched in to make the circuit resonate at a predetermined frequency. Because of this shift in resonant frequency, the number of devices on the charging surface can be detected and the primary unit can also sense when something is brought near or taken away from the charging surface. If a magnetically permeable object other than a valid secondary device is placed in the vicinity of the charging surface, it is unlikely to shift the system to the predefined quantised level. In such circumstances, the system could automatically detune and reduce the current flowing into the coil.

For a better understanding of the present invention and to show how it may be carried into effect, reference shall now be made, by way of example only, to the accompanying drawings, in which:

FIG. 2a shows the magnetic design of another typical prior art contact-less power transfer system which involves a large coil in the primary unit;

FIG. 2b shows the non-uniform field distribution inside the large coil at 5 mm distance from the plane of the coil, exhibiting a minimum in the centre;

FIGS. 6a to 6l show some alternative embodiment designs for the field generating means or a component of the field generating means of the primary unit;

FIGS. 7a and 7b show some possible designs for the magnetic unit of the secondary device;

FIGS. 8a to 8f show the effect of flux guides (the thicknesses of the flux guide has been exaggerated for clarity);

FIG. 8a shows that without flux guides, the field tends to fringe into the air directly above the active area;

FIG. 8b shows the direction of current flow in the conductors in this particular embodiment;

FIG. 8c shows that the flux is contained within the flux guides when magnetic material is placed on top of the charging area;

FIG. 8d shows a secondary device on top of the primary unit;

FIG. 8e shows a cross section of the primary unit without any secondary devices;

FIG. 8f shows a cross section of the primary unit with a secondary device on top and demonstrates the effect of using a secondary core with higher permeability than the flux guide.

Referring firstly to FIG. 1, there is shown two examples of prior art contact-less power transfer systems which both require accurate alignment of a primary unit and a secondary device. This embodiment is typically used in electric toothbrush or mobile phone chargers.

Figure 1B:
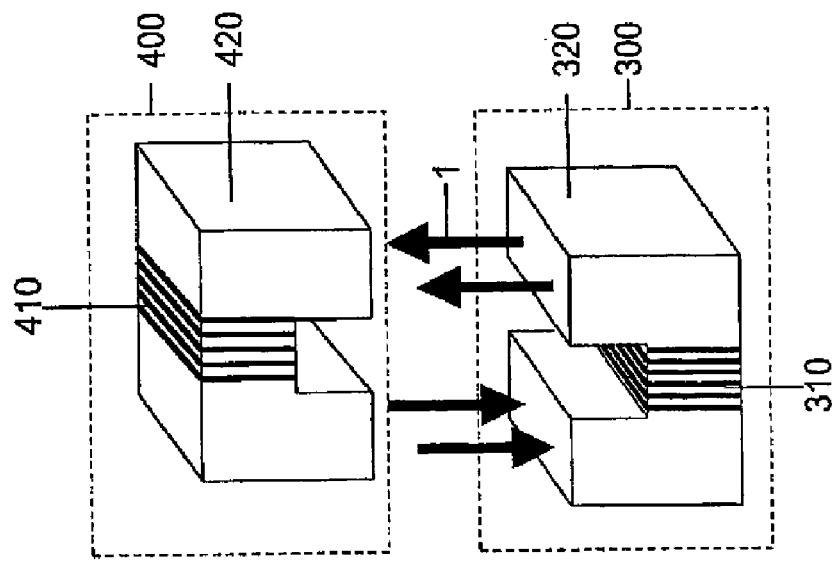
FIG. 1 shows the magnetic design of typical prior art contact-less power transfer systems which require accurate alignment of the primary unit and secondary device.
Figure 1A:
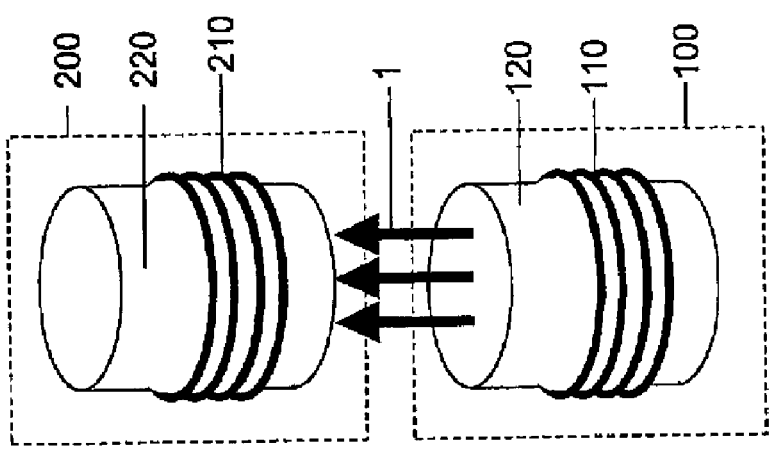

FIG. 1a shows a primary magnetic unit 100 and a secondary magnetic unit 200. On the primary side, a coil 110 is wound around a magnetic core 120 such as ferrite.

Similarly, the secondary side consists of a coil 210 wound around another magnetic core 220. In operation, an alternating current flows in to the primary coil 110 and generates lines of flux 1. When a secondary magnetic unit 200 is placed such that it is axially aligned with the primary magnetic unit 100, the flux 1 will couple from the primary into the secondary, inducing a voltage across the secondary coil 210.

FIG. 1b shows a split transformer. The primary magnetic unit 300 consists of a U-shaped core 320 with a coil 310 wound around it. When alternating current flows into the primary coil 310, changing lines of flux are generated 1. The secondary magnetic unit 400 consists of a second U-shaped core 420 with another coil 410 wound around it. When the secondary magnetic unit 400 is placed on the primary magnetic unit 300 such that the arms of the two U-shaped cores are in alignment, the flux will couple effectively into the core of the secondary 420 and induce voltage across the secondary coil 410.

FIG. 2a is another embodiment of prior art inductive systems typically used in powering radio frequency passive tags. The primary typically consists of a coil 510 covering a large area. Multiple secondary devices 520 will have voltage induced therein when they are within the area encircled by the primary coil 510. This system does not require the secondary coil 520 to be accurately aligned with the primary coil 510. FIG. 2b shows a graph of the magnitude of magnetic flux intensity across the area encircled by the primary coil 510 at 5 mm above the plane of the primary coil. It shows a non-uniform field, which exhibits a minimum 530 at the centre of the primary coil 510.

Figure 3:
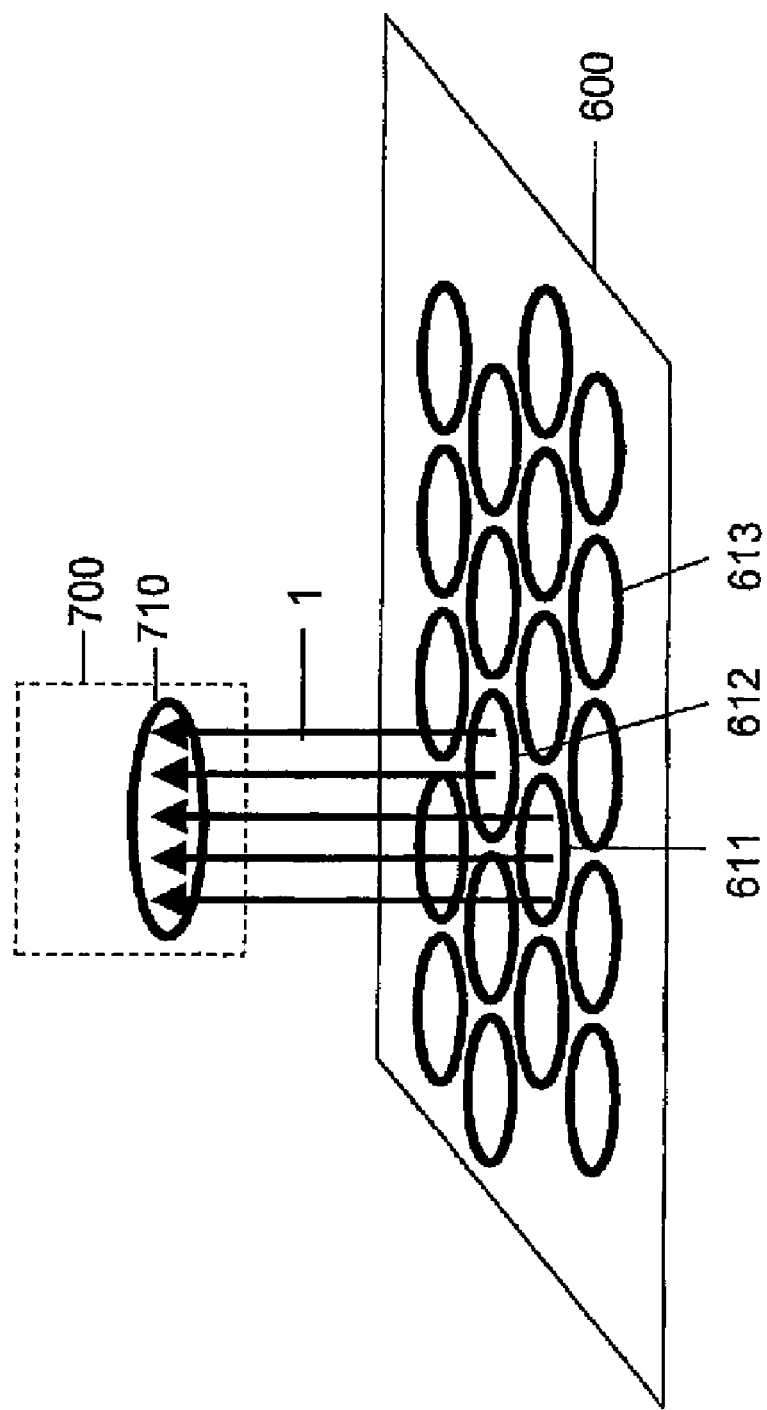
FIG. 3 shows a multiple-coil system where each coil is independently driven such that a localised field can be generated.

FIG. 3 is another embodiment of a prior art inductive system wherein a multiple coil array is used. The primary magnetic unit 600 consists of an array of coils including coils 611, 612, 613. The secondary magnetic unit 700 may consist of a coil 710. When the secondary magnetic unit 700 is in proximity to some coils in the primary magnetic unit 600, the coils 611, 612 are activated while other coils such as 613 remain inactive. The activated coils 611, 612 generate flux, some of which will couple into the secondary magnetic unit 700.

FIG. 4 shows an embodiment of the proposed invention. FIG. 4a shows a primary coil 710 wound or printed in such a fashion that there is a net instantaneous current flow within the active area 740. For example, if a dc current flows through the primary coil 710, the conductors in the active area 740 would all have current flowing in the same direction. Current flowing through the primary coil 710 generates flux 1. A layer of magnetic material 730 is present beneath the charging area to provide a return path for the flux. FIG. 4b shows the same primary magnetic unit as shown in FIG. 4a with two secondary devices 800 present. When the secondary devices 800 are placed in the correct orientation on top of the charging area 740 of the primary magnetic unit, the flux 1 will flow through the magnetic core of the secondary devices 800 instead of flowing through the air. The flux 1 flowing through the secondary core would hence induce current in the secondary coil.

Figure 4A:
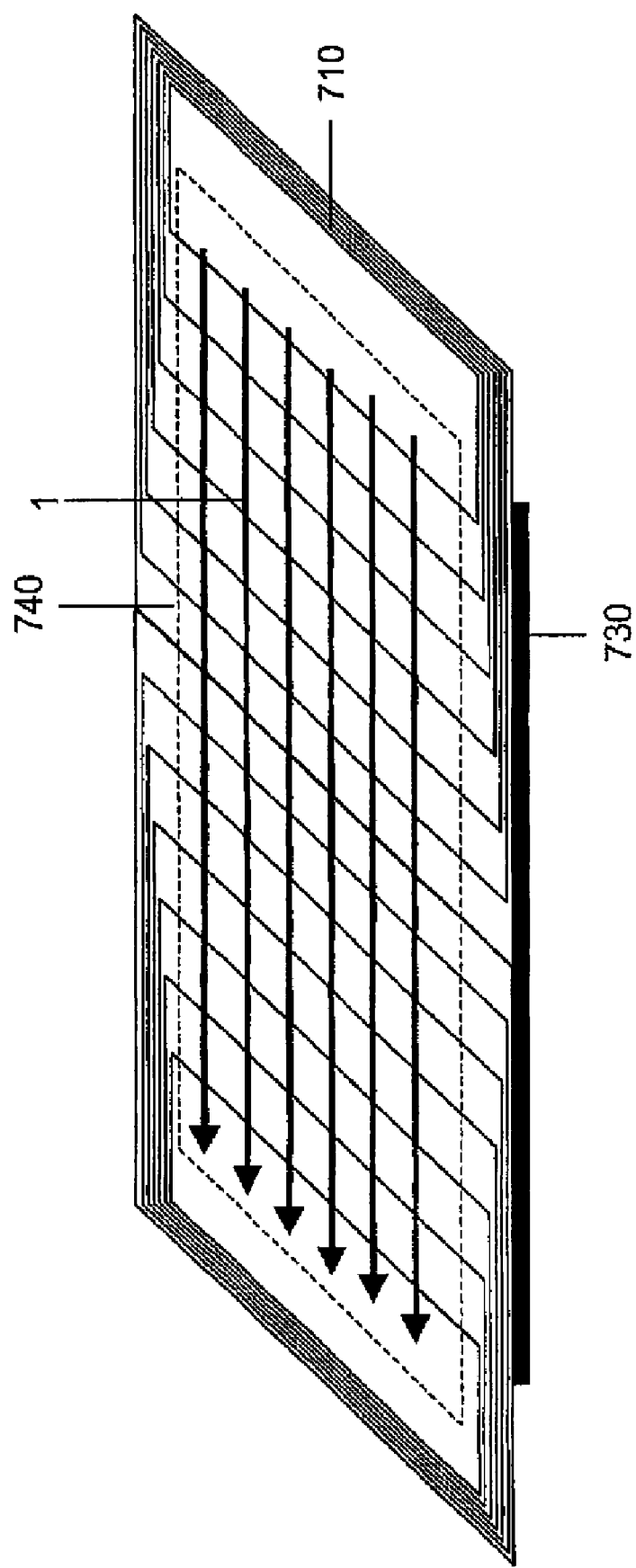
FIG. 4a shows an embodiment of the proposed system which demonstrates a substantial departure from prior art with no secondary devices present.
Figure 4B:
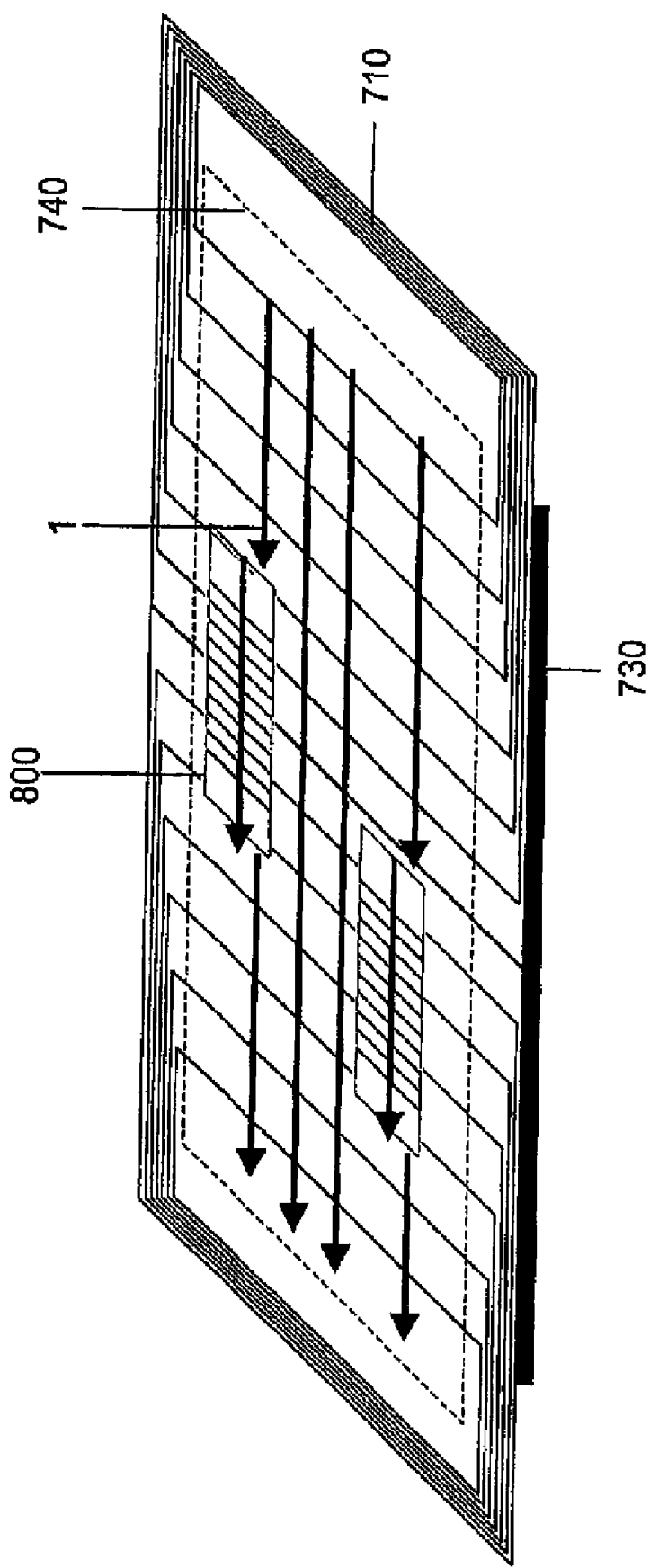
FIG. 4b shows an embodiment of the proposed system with two secondary devices present.
Figure 4C:
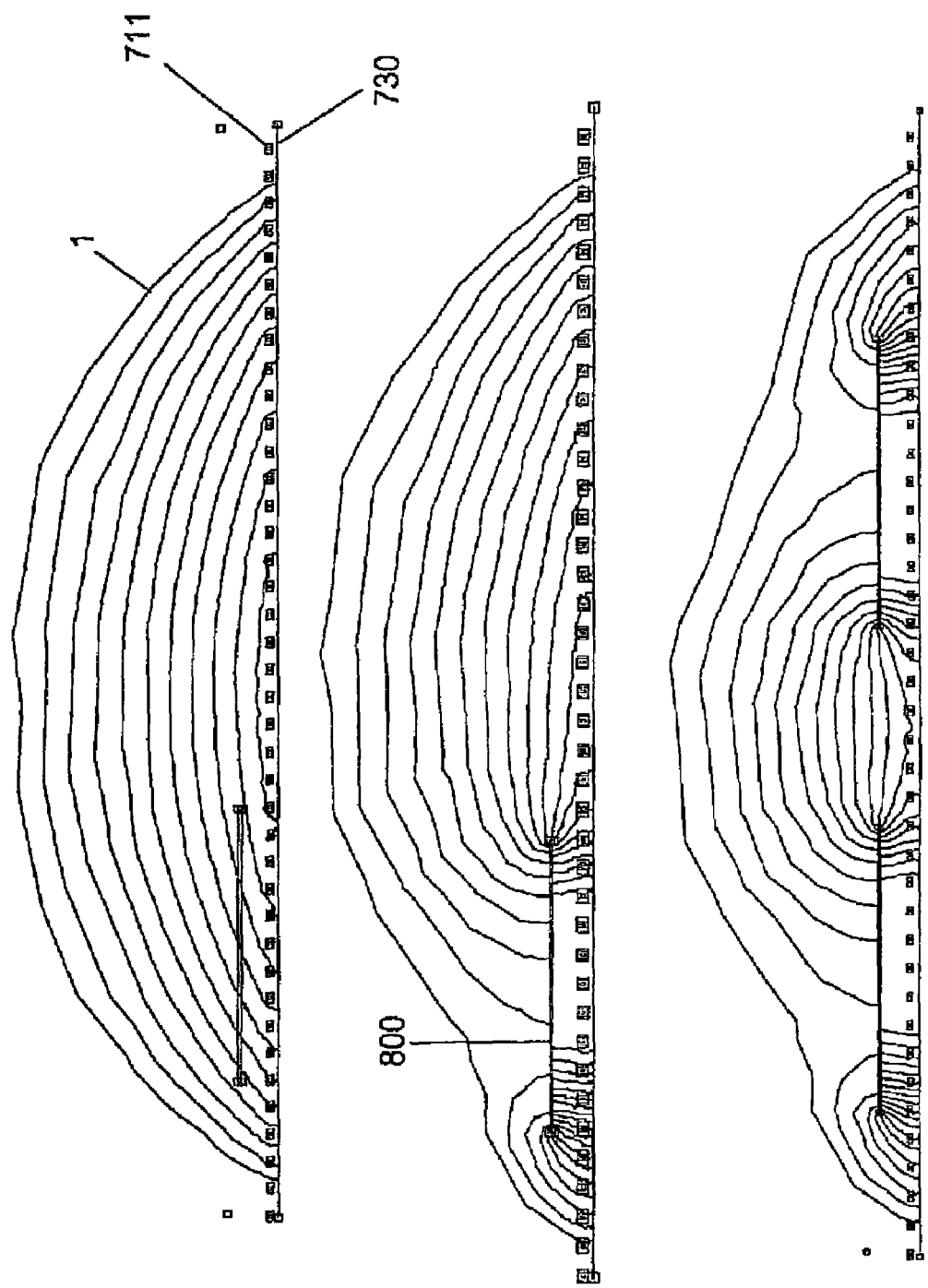
FIG. 4c shows a cross section of the active area of the primary unit and the contour lines of the magnetic flux density generated by the conductors.

FIG. 4c shows some contour lines for the flux density of the magnetic field generated by the conductors 711 in the charging area 740 of the primary magnetic unit. There is a layer of magnetic material 730 beneath the conductors to provide a low reluctance return path for the flux.

Figure 4D:
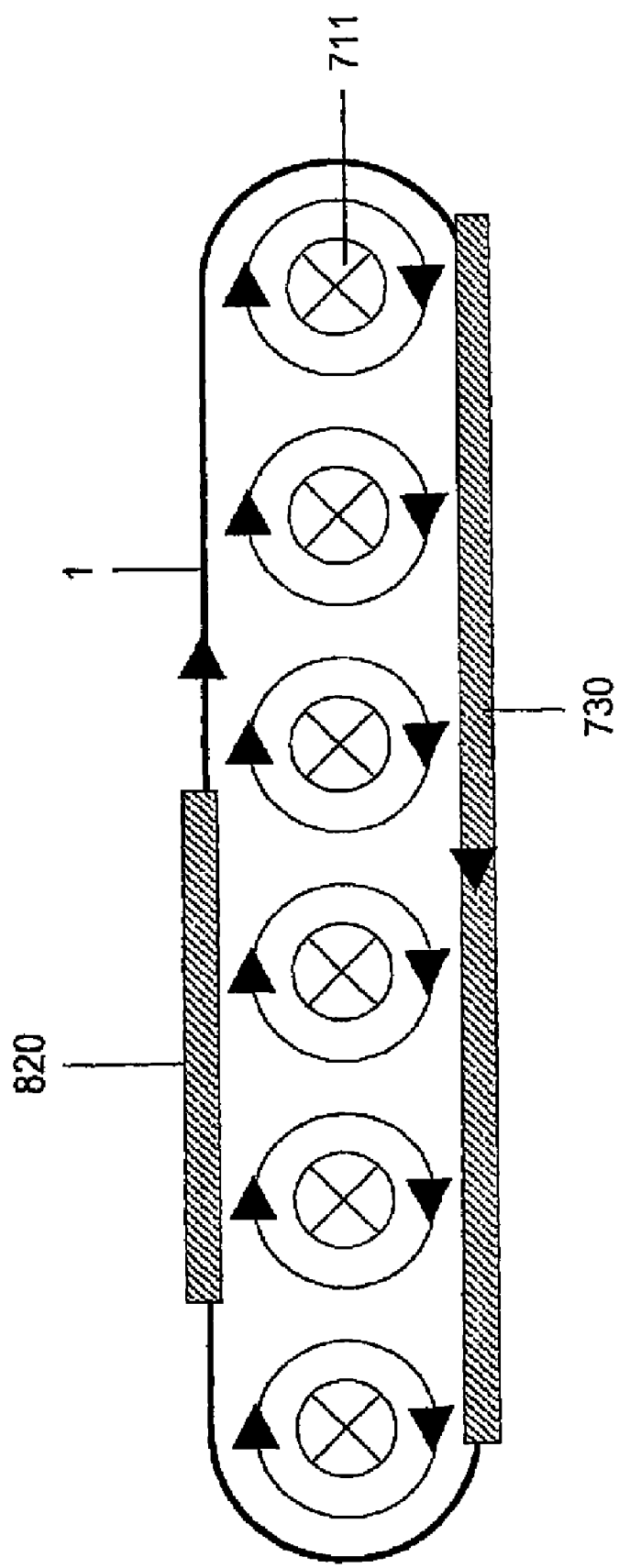
FIG. 4d shows the magnetic circuit for this particular embodiment of the proposed invention.

FIG. 4d shows a cross-section of the charging area 740 of the primary magnetic unit. A possible path for the magnetic circuit is shown. The magnetic material 730 provides a low reluctance path for the circuit and also the magnetic core 820 of the secondary magnetic device 800 also provides a low reluctance path. This minimizes the distance the flux has to travel through the air and hence minimizes leakage.

Figure 5:
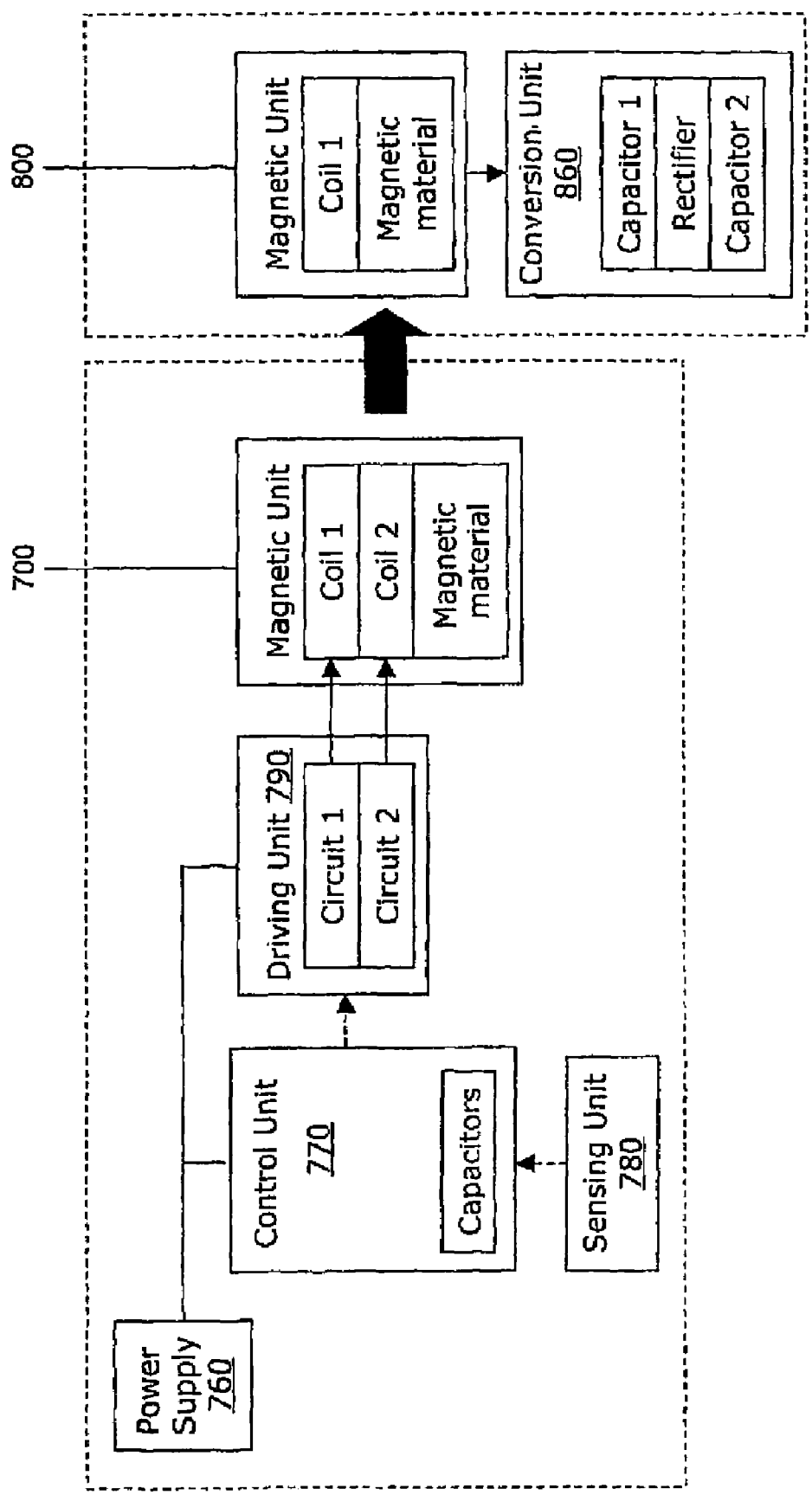
FIG. 5 shows a schematic drawing of an embodiment of the primary unit and the secondary device.

FIG. 5 shows a schematic drawing of an embodiment of the whole system of the proposed invention. In this embodiment, the primary unit consists of a power supply 760, a control unit 770, a sensing unit 780 and an electromagnetic unit 700. The power supply 760 converts the mains (or other sources of power) into a dc supply at an appropriate voltage for the system. The control unit 770 controls the driving unit 790 which drives the magnetic unit 700. In this embodiment, the magnetic unit consists of two independently driven components, coil 1 and coil 2, arranged such that the conductors in the charging area of coil 1 would be perpendicular to the conductors in the charging area of coil 2. When the primary unit is activated, the control unit causes a 90-degree phase shift between the alternating current that flows through coil 1 and coil 2. This creates a rotating magnetic dipole on the surface of the primary magnetic unit 700 such that a secondary device is able to receive power regardless of its rotational orientation (See FIG. 9). In standby mode where no secondary devices are present, the primary unit is detuned and current flow into the magnetic unit 700 is minimised. When a secondary device is placed on top of the charging area of the primary unit, the inductance of the primary magnetic unit 700 is changed. This brings the primary circuit into resonance and the current flow is maximised. When there are two secondary devices present on the primary unit, the inductance is changed to yet another level and the primary circuit is again detuned. At this point, the control unit 770 uses feedback from the sensing unit 780 to switch another capacitor into the circuit such that it is tuned again and current flow is maximised. In this embodiment, the secondary devices are of a standard size and a maximum of six standard-sized devices can receive power from the primary unit simultaneously. Due to the standard sizes of the secondary devices, the change in inductance due to the change in secondary devices in proximity is quantized to a number of predefined levels such that only a maximum of 6 capacitances is required to keep the system operating at resonance.

Figure 6E:
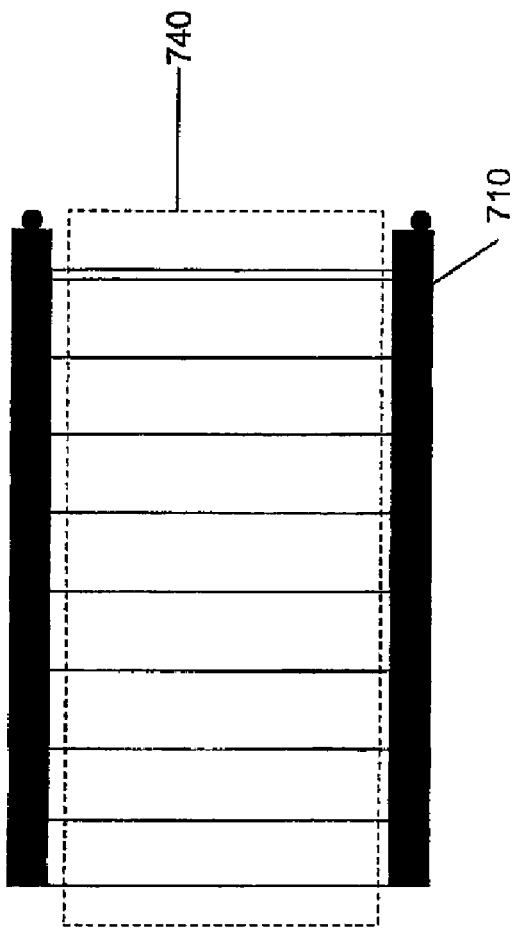

FIGS. 6a to 6l show a number of different embodiments for the coil component of the primary magnetic unit. These embodiments may be implemented as the only coil component of the primary magnetic unit, in which case the rotation of the secondary device is important to the power transfer. These embodiments may also be implemented in combination, not excluding embodiments which are not illustrated here. For example, two coils illustrated in FIG. 6a may be placed at 90 degrees to each other to form a single magnetic unit. In FIGS. 6a to 6e, the charging area 740 consists of a series of conductors with net current generally flowing in the same direction. In certain configurations, such as FIG. 6c, there is no substantial linkage when the secondary device is placed directly over the centre of the coil and hence power is not transferred. In FIG. 6d, there is no substantial linkage when the secondary device is positioned in the gap between the two charging areas 740.

Figure 6F:
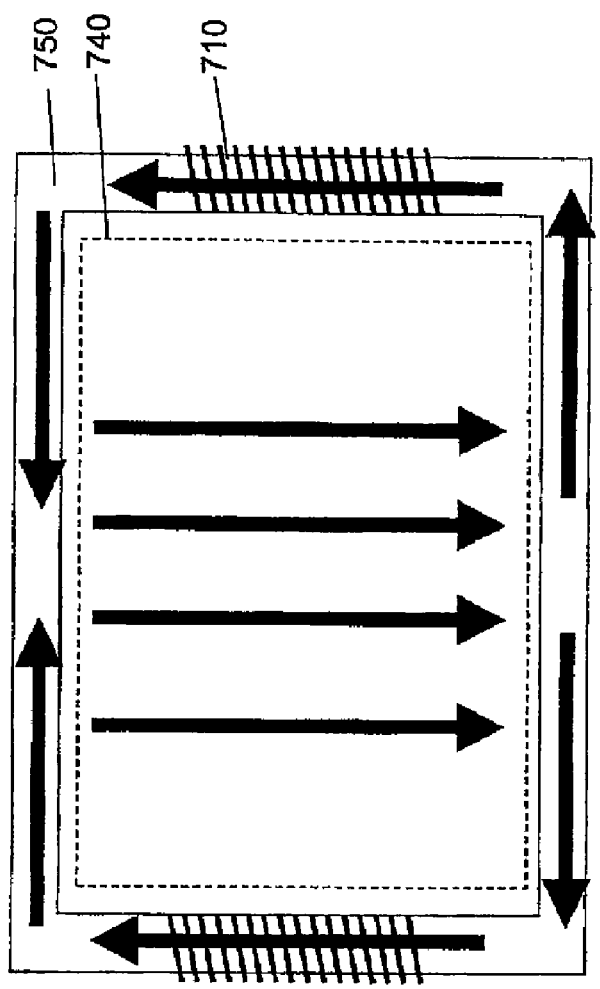

FIG. 6f shows a specific coil configuration for the primary unit adapted to generate electromagnetic field lines substantially parallel to a surface of the primary unit within the charging area 740. Two primary windings 710, one on either side of the charging area 740, are formed about opposing arms of a generally rectangular flux guide 750 made out of a magnetic material, the primary windings 710 generating opposing electromagnetic fields. The flux guide 750 contains the electromagnetic fields and creates a magnetic dipole across the charging area 740 in the direction of the arrows indicated on the Figure. When a secondary device is placed in the charging area 740 in a predetermined orientation, a low reluctance path is created and flux flows through the secondary device, causing, effective coupling and power transfer. It is to be appreciated that the flux guide 750 need not be continuous, and may in fact be formed as two opposed and non-linked horseshoe components.

Figure 6G:
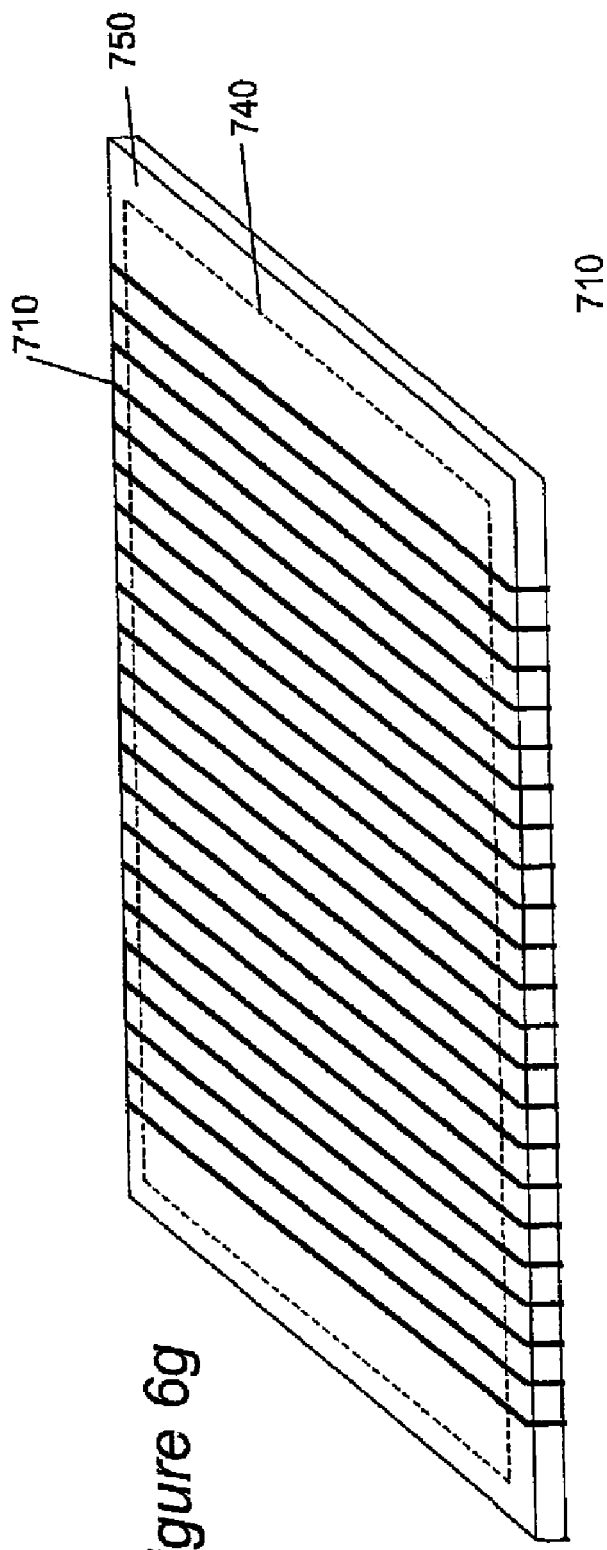

FIG. 6g shows another possible coil configuration for the primary unit, the coil configuration being adapted to generate electromagnetic field lines substantially parallel to the charging surface of the primary unit within the charging area 740. A primary winding 710 is wound around a magnetic core 750 which may be ferrite or some other suitable material. The charging area 740 includes a series of conductors with instantaneous net current generally flowing in the same direction. The coil configuration of FIG. 6g is in fact capable of supporting or defining a charging area 740 on both upper and lower faces as shown in the drawing, and depending on the design of the primary unit, one or both of the charging areas may be made available to secondary devices.

Figure 6H:
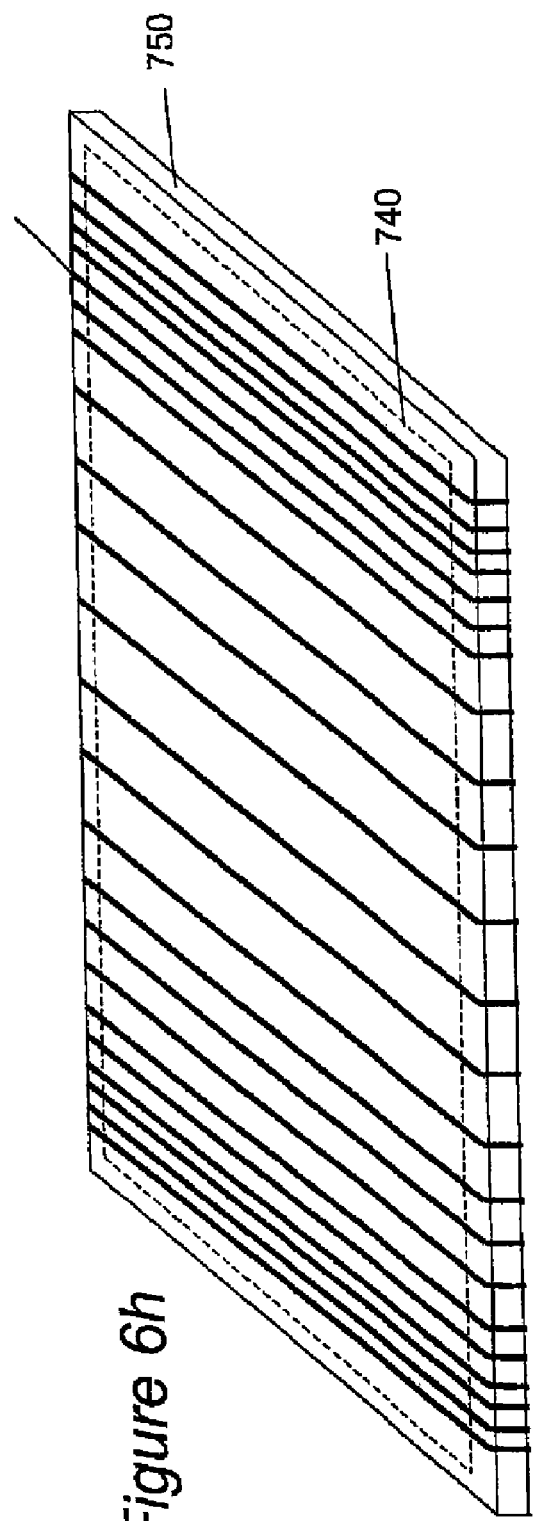

FIG. 6h shows a variation of the configuration of FIG. 6g. Instead of the primary windings 710 being evenly spaced as in FIG. 6g, the windings 710 are not evenly spaced. The spacing and variations therein can be selected or designed so as to provide improved uniformity of performance or field strength levels over the charging area 740.

Figure 6I:
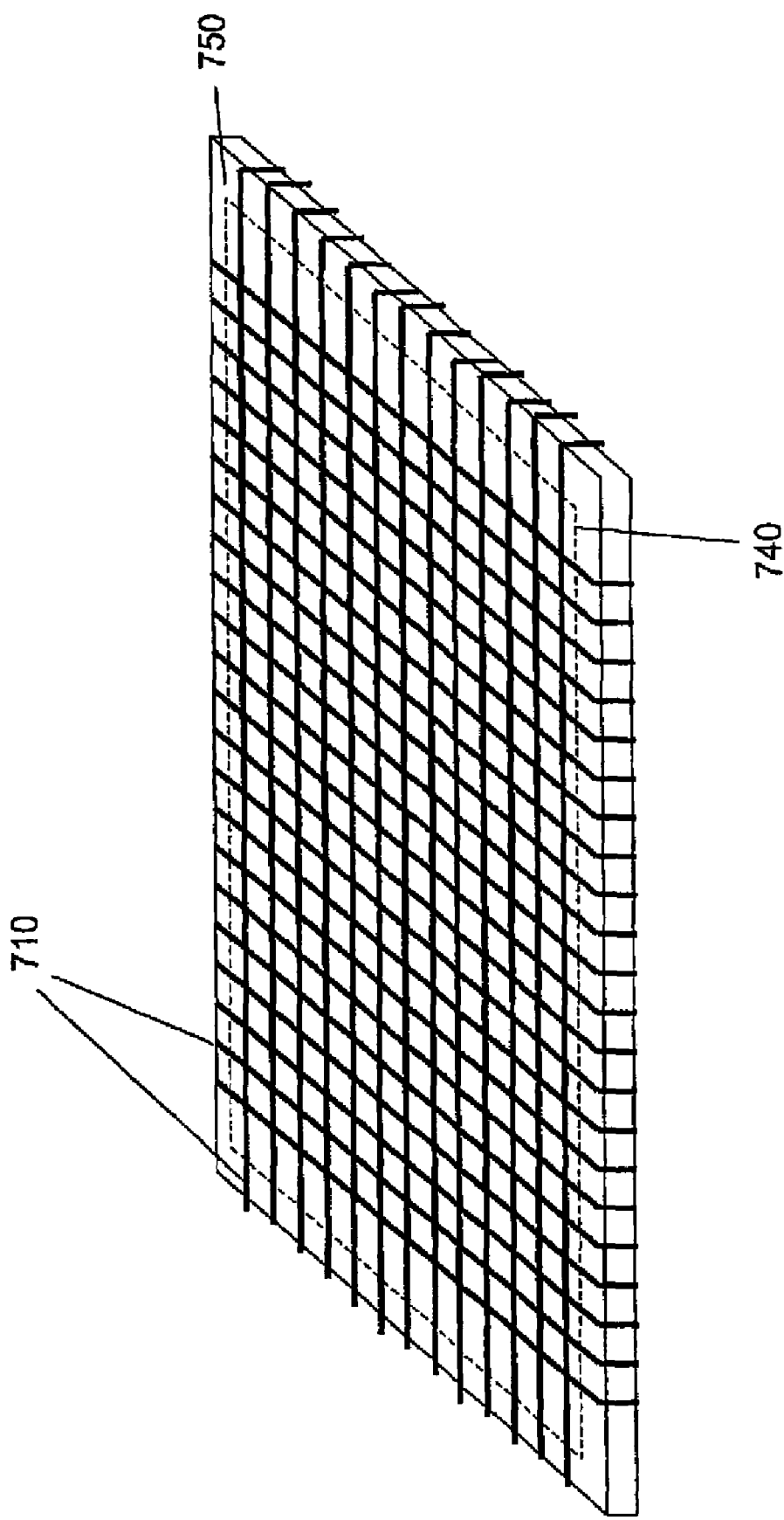

FIG. 6i shows an embodiment in which two primary windings 710 as shown in FIG. 6g are located in a mutually orthogonal configuration so as to enable a direction of the field lines to be dynamically switched or rotated to other orientations about the plane of the charging surface.

Figure 6J:
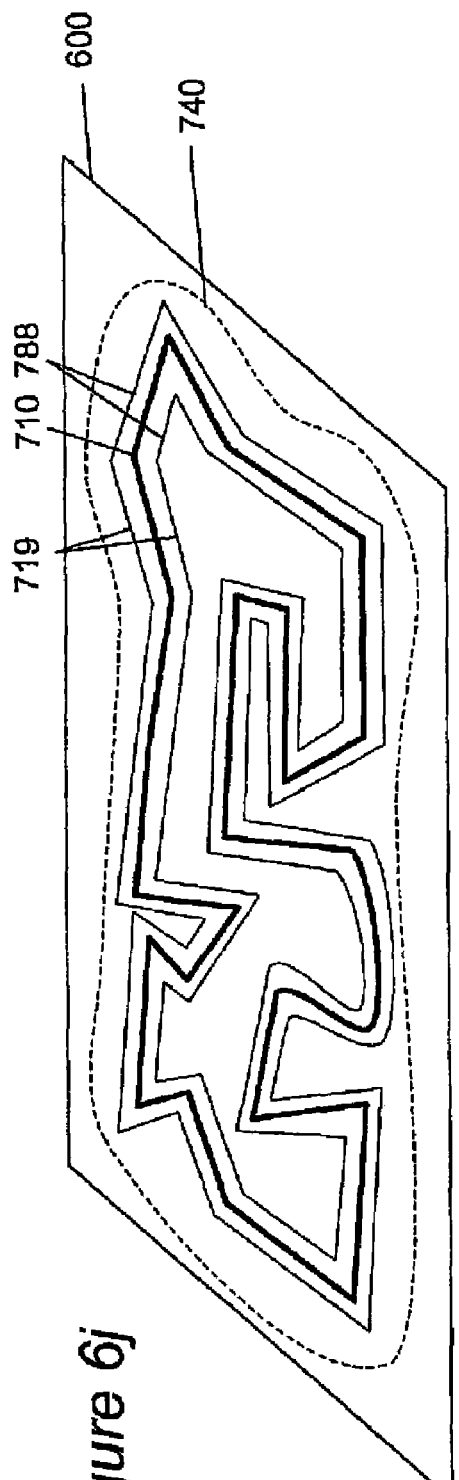
Figure 6K:
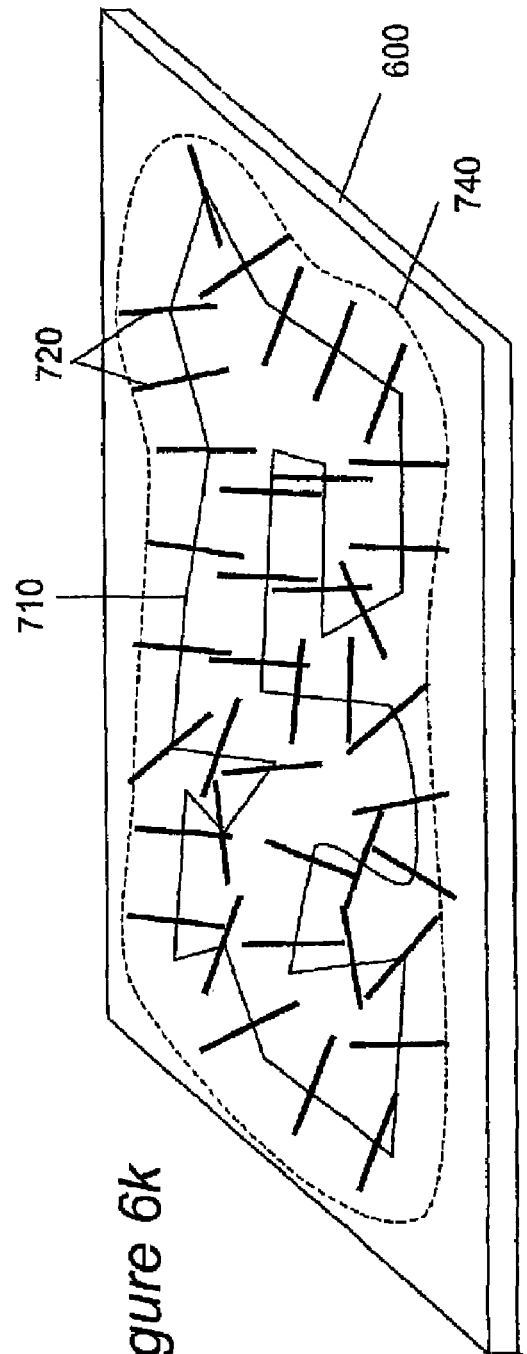

FIGS. 6j and 6k show additional two-coil configurations for the primary unit which are not simple geometric shapes with substantially parallel conductors.

In FIG. 6j, line 710 indicates one of a set of current-carrying conductors lying in the plane of the charging surface 600. The shape of the main conductor 710 is arbitrary and need not be a regular geometric figure—indeed, conductor 710 may have straight and curved sections and may intersect with itself. One or more subsidiary conductors 719 are arranged alongside and generally parallel (at any given local point) to the main conductor 710 (only two subsidiary conductors 719 are shown here for clarity). Current flow in subsidiary conductors 719 will be in the same direction as in the main conductor 710. The subsidiary conductors 719 may be connected in series or parallel so as to form a single coil arrangement.

In FIG. 6k, a set of current-carrying conductors 720 (only some of which are shown for clarity) is arranged in the plane of the charging surface 600. A main conductor 710 is provided as in FIG. 6j, and the conductors 720 are each arranged so as to be locally orthogonal to the main conductor 710. The conductors 720 may be connected in series or parallel so as to form a single coil arrangement. If a first sinusoidal current is fed into the conductor 710, and a second sinusoidal current having a 90° phase shift relative to the first current is fed into the coil 720, then by varying the relative proportions and signs of the two currents a direction of a resultant electromagnetic field vector at most points on the charging area 740 will be seen to rotate through 360°.

Figure 6L:
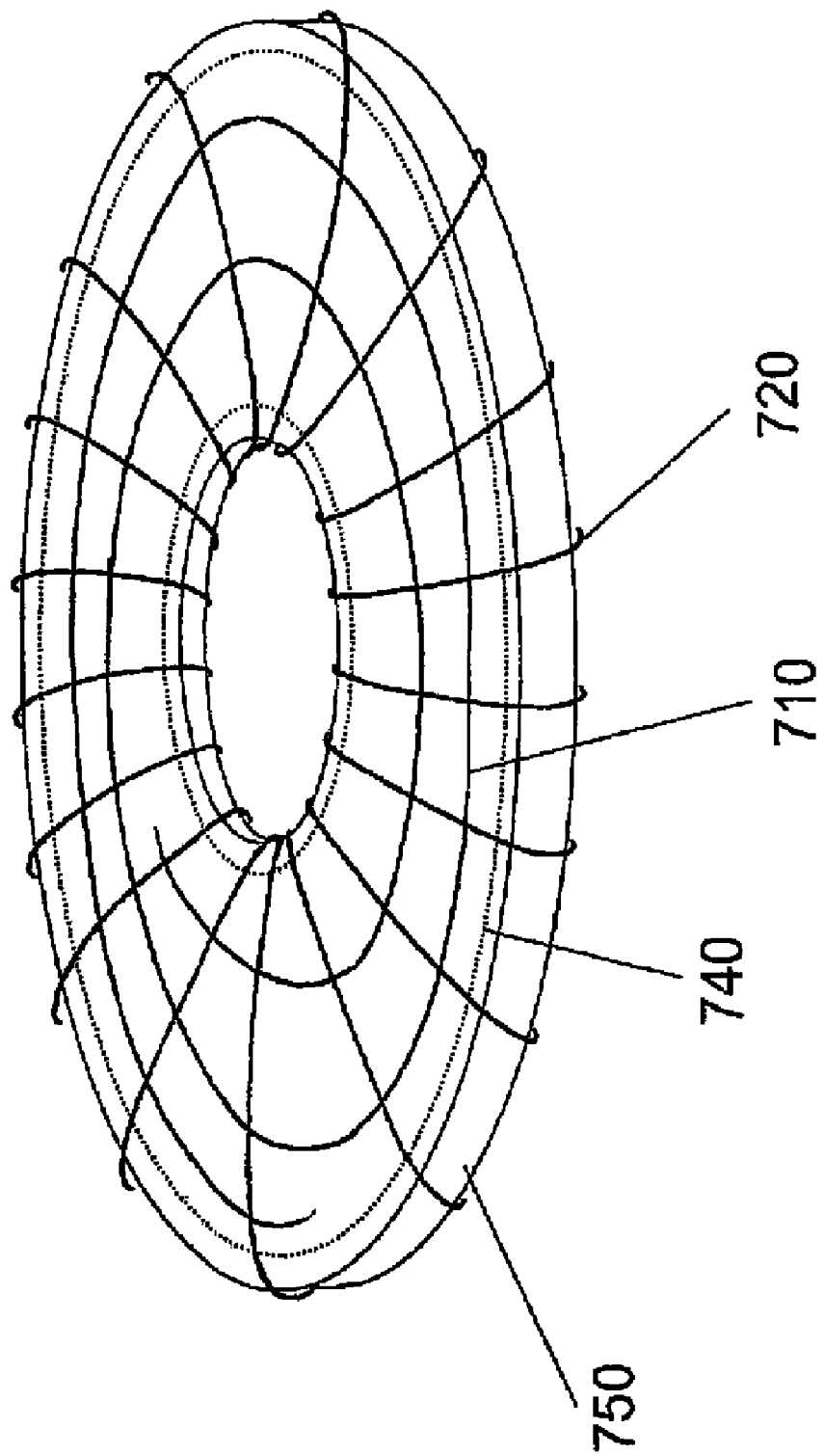

FIG. 6l shows yet another alternative arrangement in which the magnetic core 750 is in the shape of a round disc with a hole in the centre. The first set of current carrying conductors 710 is arranged in a spiral shape on the surface of the round disc. The second set of conductors 720 is wound in a toroidal format through the centre of the disc and out to the perimeter in a radial fashion. These conductors can be driven in such a way, for example with sinusoidal currents at quadrature, that when a secondary device is placed at any point inside the charging area 740 and rotated about an axis perpendicular to the charging area, no nulls are observed by the secondary device.

FIGS. 7a and 7b are embodiments of the proposed secondary devices. A winding 810 is wound around a magnetic core 820. Two of these may be combined in a single secondary device, at right angles for example, such that the secondary device is able to effectively couple with the primary unit at all rotations. These may also be combined with standard coils, as the ones shown in FIG. 2a 520 to eliminate dead spots.

FIG. 8 shows the effect of flux guides 750 positioned on top of the charging area. The thickness of the material has been exaggerated for the sake of clarity but in reality would be in the order of millimeters thick. The flux guides 750 will minimize leakage and contain the flux at the expense of reducing the amount of flux coupled to the secondary device. In FIG. 8a, a primary magnetic unit is shown without flux guides 750. The field will tend to fringe into the air directly above the charging area. With flux guides 750, as shown in FIG. 8b to 8f, the flux is contained within the plane of the material and leakage is minimised. In FIG. 8e, when there is no secondary device 800 on top, the flux remains in the flux guide 750. In FIG. 8f, when a secondary device 800 is present with a relatively more permeable material as the core, part of the flux will flow via the secondary device. The permeability of the flux guide 750 can be chosen such that it is higher than that of typical metals such as steel. When other materials such as steel, which are not part of secondary devices 800, are placed on top, most of the flux will remain in the flux guide 750 instead of travelling through the object. The flux guide 750 may not be a continuous layer of magnetic material but may have small air gaps in them to encourage more flux flow into the secondary device 800 when it is present.

Figure 9B:
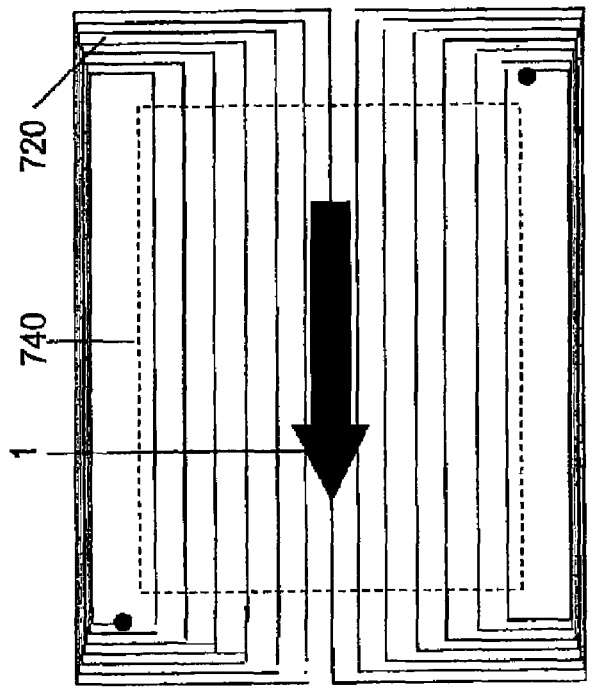
FIG. 9b shows a similar coil arrangement to FIG. 9a except rotated by 90 degrees.
Figure 9A:
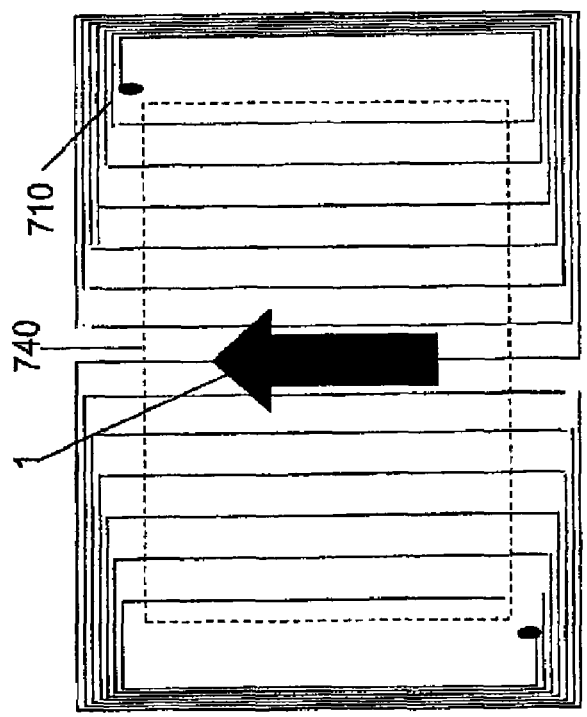
FIG. 9a shows a particular coil arrangement with a net instantaneous current flow shown by the direction of the arrow.
Figure 9C:
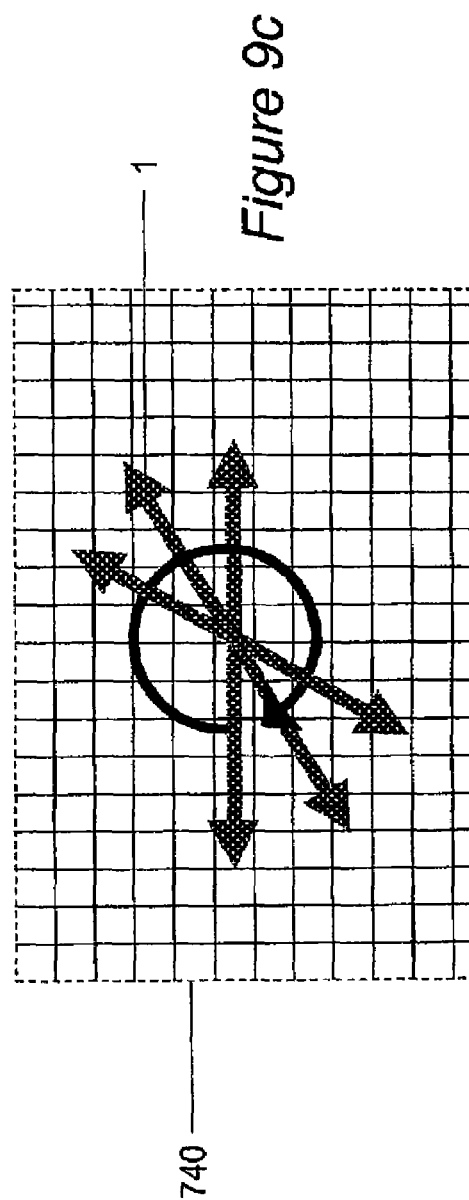
FIG. 9c shows the charging area of the primary unit if the coil of FIG. 9a is placed on top of FIG. 9b. If the coil in FIG. 9a is driven in quadrature to FIG. 9b, the effect is a rotating magnetic dipole shown here.

FIG. 9 shows an embodiment of a primary unit whereby more than one coil is used. FIG. 9a shows a coil 710 with a charging area 740 with current flow parallel to the direction of the arrow 2. FIG. 9b shows a similar coil arranged at 90 degrees to the one in FIG. 9a. When these two coils are placed on top of each other such that the charging area 740 overlaps, the charging area will look like the illustration in FIG. 9c. Such an embodiment would allow the secondary device to be at any rotation on top of the primary unit and couple effectively.

Figure 10:
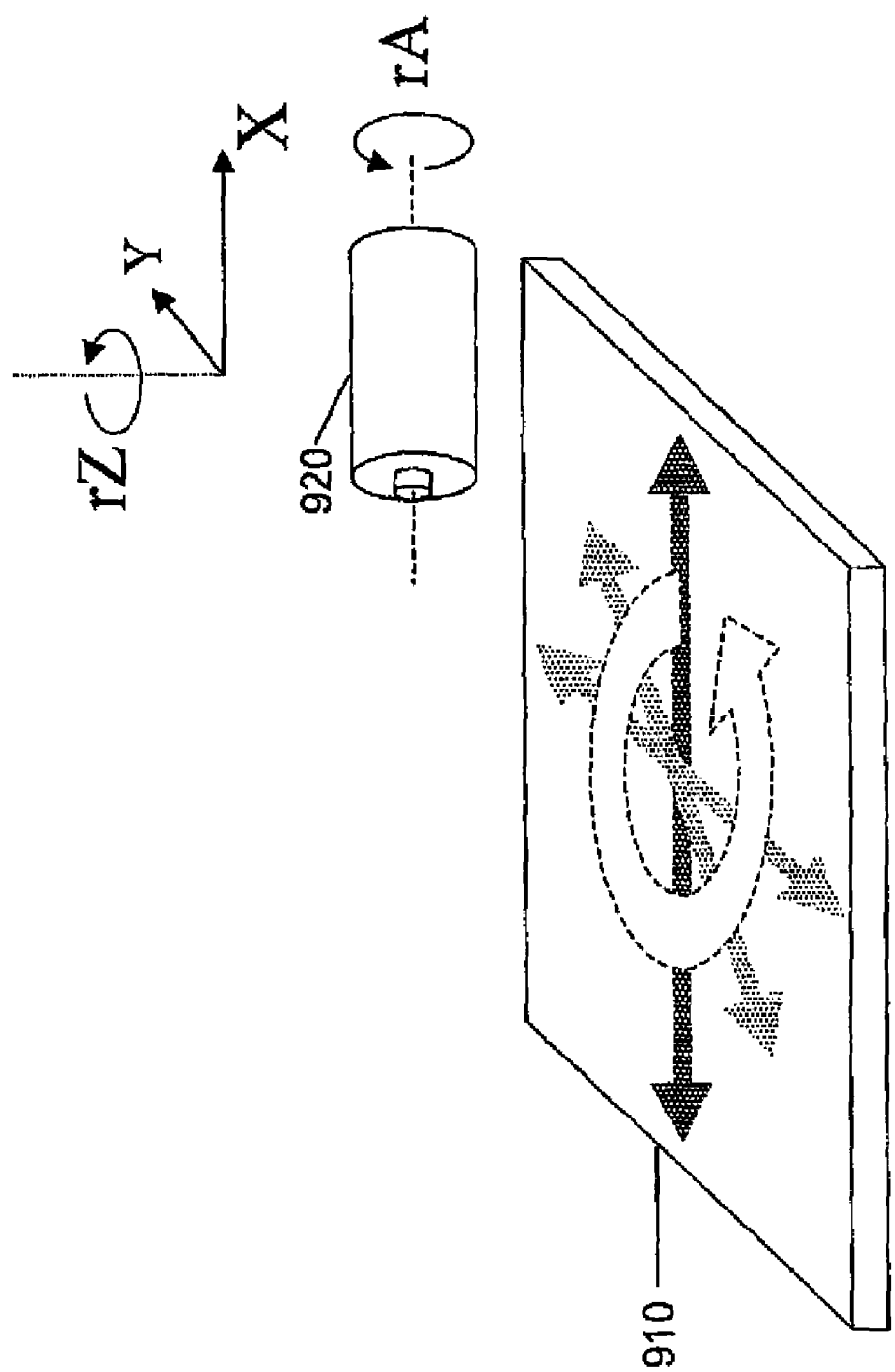
FIG. 10 shows the case where the secondary device has an axial degree of rotation.

FIG. 10 shows an embodiment where the secondary device has an axial degree of rotation, for example where it is, or is embedded within, a battery cell. In this embodiment the secondary device may be constructed such that it couples to the primary flux when in any axial rotation (rA) relative to the primary unit (910), as well as having the same degrees of freedom described above (i.e. translational (X,Y) and optionally rotational perpendicular to the plane of the primary (rZ)).

Figure 11B:
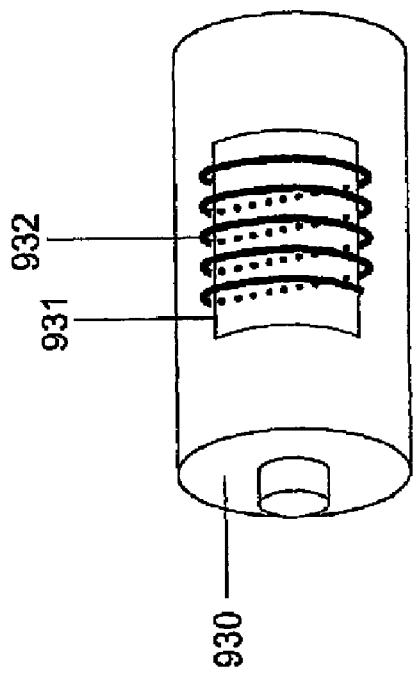
FIG. 11 shows various arrangements of secondary devices with axial degrees of rotation.
Figure 11C:
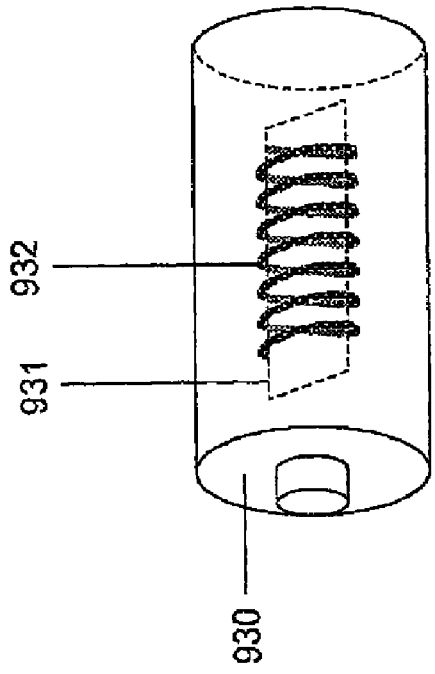
Figure 11A:
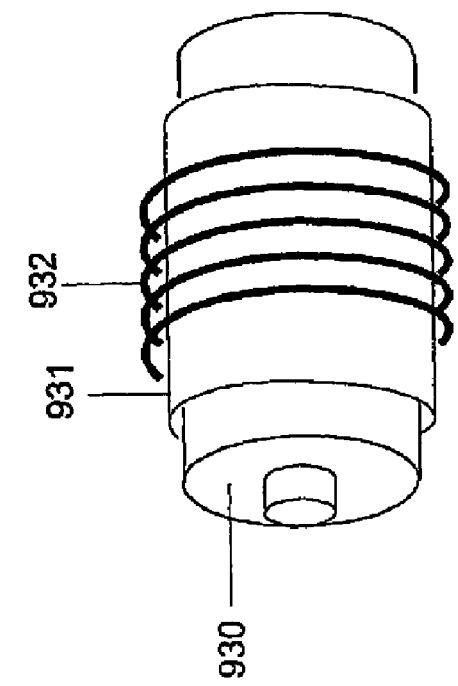

FIG. 11a shows one arrangement where a rechargeable battery cell 930 is wrapped with an optional cylinder of flux-concentrating material 931 which is itself wound with copper wire 932. The cylinder may be long or short relative to the length of the cell.

FIG. 11b shows another arrangement where the flux-concentrating material 931 covers only part of the surface of the cell 930, and has copper wire 932 wrapped around it (but not the cell). The material and wire may be conformed to the surface of the cell. Their area may be large or small relative to the circumference of the cell, and long or short relative to the length of the cell.

FIG. 11c shows another arrangement where the flux-concentrating material 931 is embedded within the cell 930 and has copper wire 932 wrapped around it. The material may be substantially flat, cylindrical, rod-like, or any other shape, its width may be large or small relative to the diameter of the cell, and its length may be large or small relative to the length of the cell.

In any case shown in FIGS. 10 and 11, any flux-concentrating material may also be a functional part of the battery enclosure (for example, an outer zinc electrode) or the battery itself (for example, an inner electrode).

In any case shown in FIGS. 10 and 11; the power may be stored in a smaller standard cell (e.g. AAA size) fitted within the larger standard cell enclosure (e.g. AA).

Figure 12A:
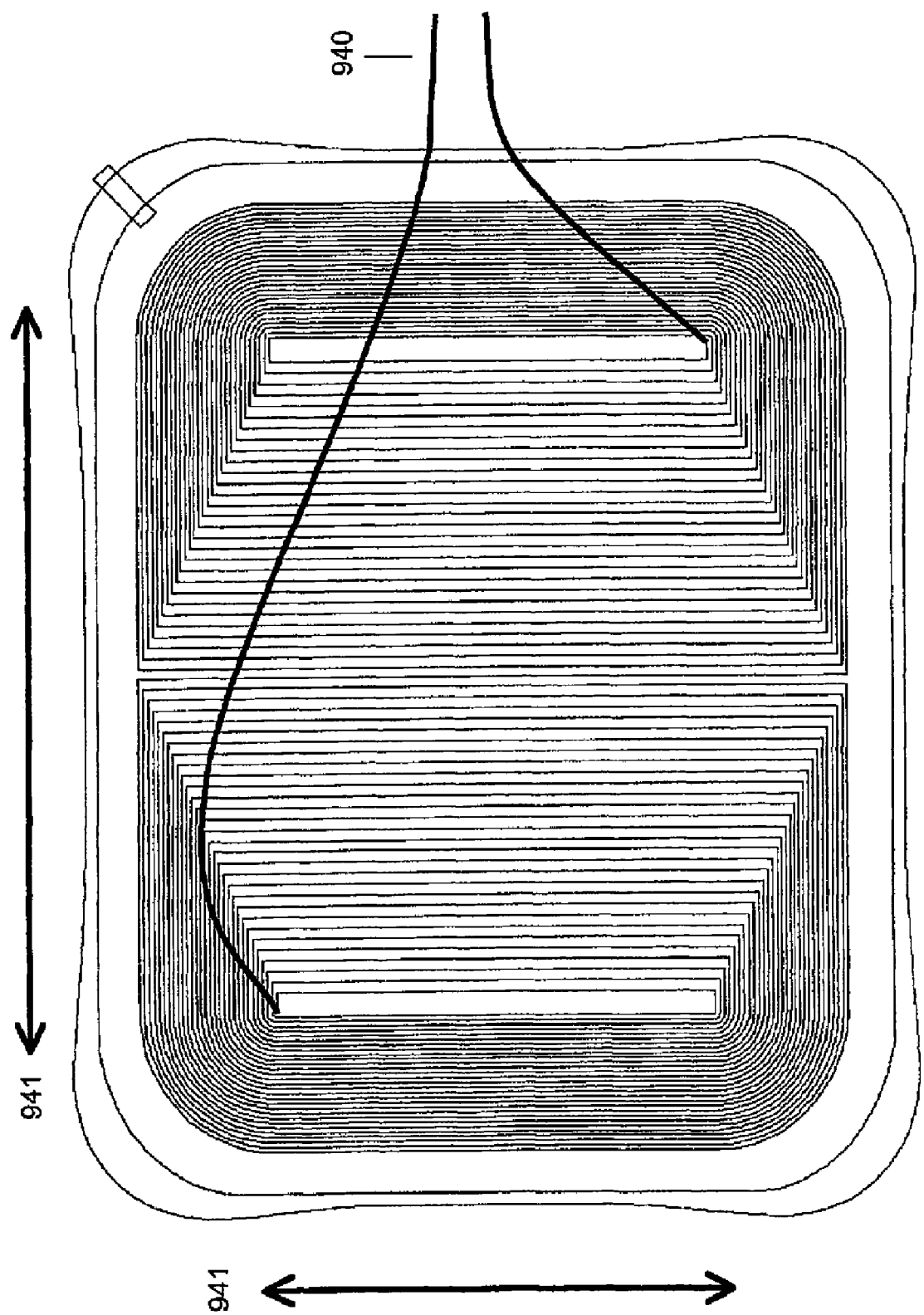
FIG. 12a and FIG. 12b show another embodiment of the type of coil arrangement shown in FIG. 9a and FIG. 9b.
Figure 12B:
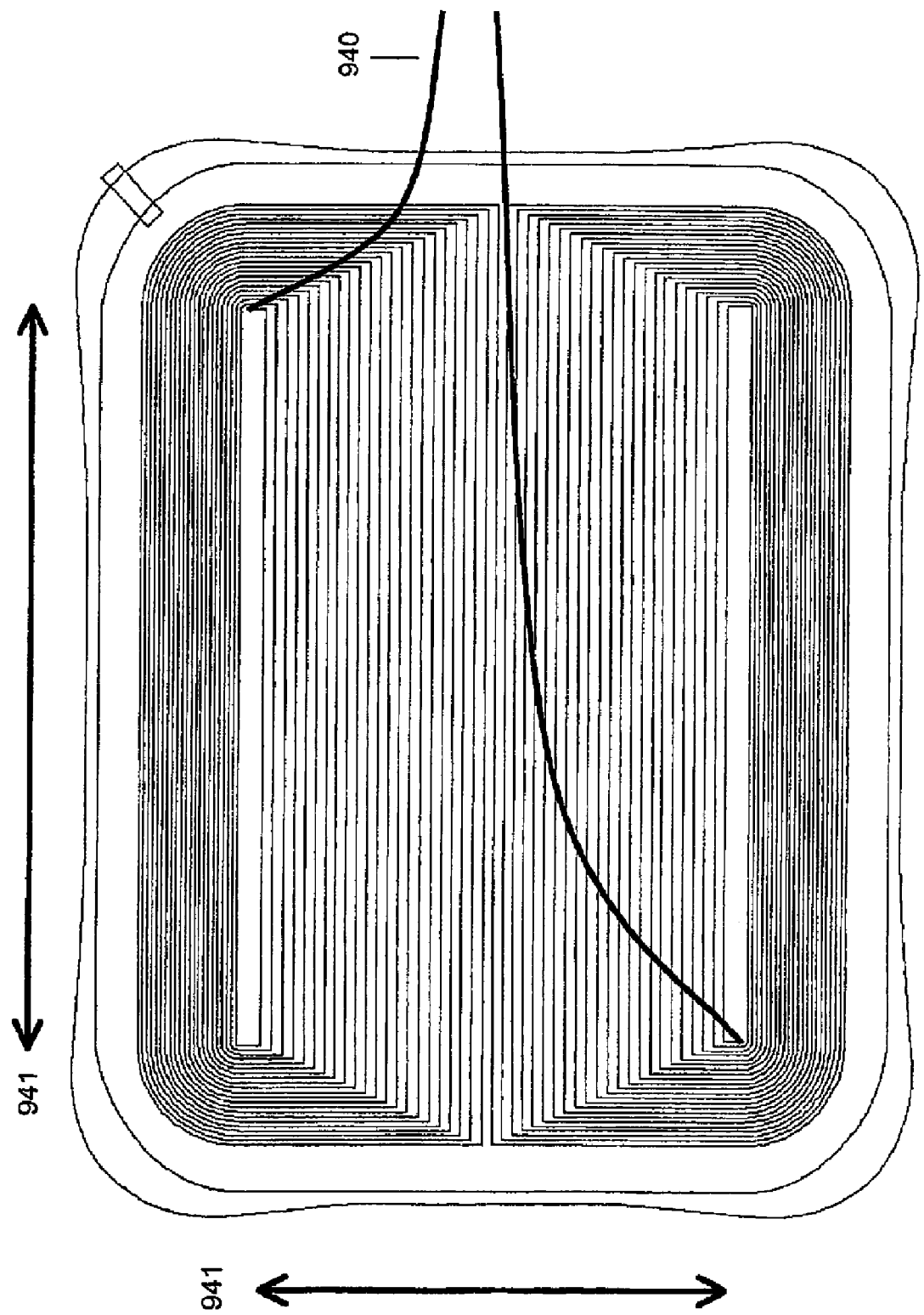

FIG. 12 shows an embodiment of a primary unit similar to that shown in FIG. 9. FIG. 12a shows a coil generating a field in a direction horizontal to the page, FIG. 12b shows another coil generating a field vertical to the page, and the two coils would be mounted in a substantially coplanar fashion, possibly with one above the other, or even intertwined in some fashion. The wire connections to each coil are shown 940 and the charging area is represented by the arrows 941.

Figure 13:
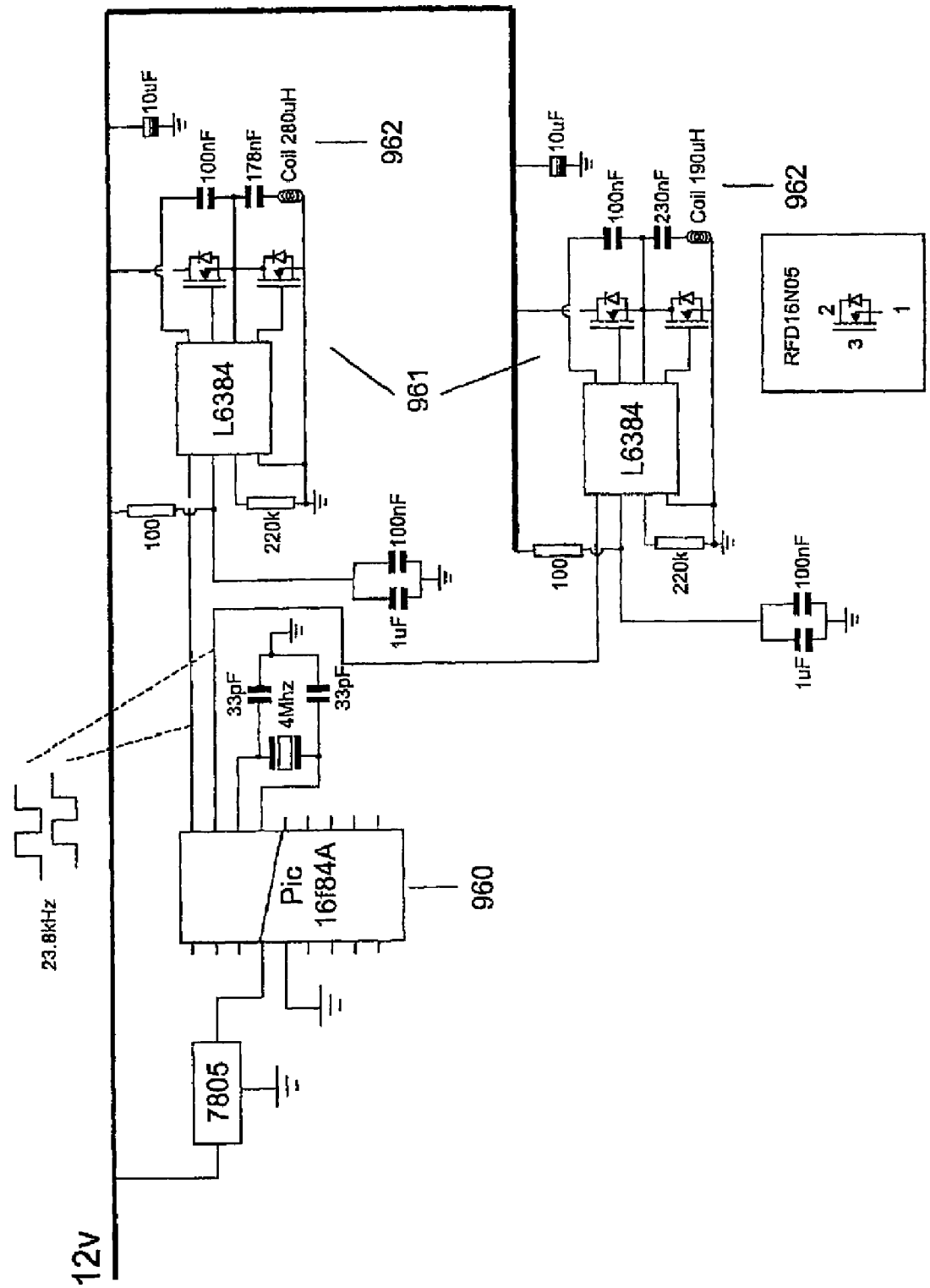
FIG. 13 shows a simple embodiment of driving unit electronics.

FIG. 13 shows a simple embodiment of the Driving Unit (790 of FIG. 5). In this embodiment there is no Control Unit. The PIC processor 960 generates two 23.8 kHz square waves 90 degrees out of phase with one another. These are amplified by components 961 and driven into two coil components 962, which are the same magnetic units shown in FIG. 12a and FIG. 12b. Although the driving unit is providing square waves, the high resonant "Q" of the magnetic units shapes this into a sinusoidal waveform.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A portable electrical or electronic device, adapted to receive power inductively from an external unit that has a field generating surface and a field generator which generates an electromagnetic field at or over the field generating surface, the device being adapted to receive power from the external unit when placed in an intended power-receiving disposition on or in proximity to said field generating surface and being separable from the external unit when not receiving power therefrom, the device comprising:
   a housing including a predetermined portion having an external surface which faces said field generating surface when the device is placed in said power-receiving disposition, said predetermined portion also having an internal surface; and
   a magnetic core component arranged within said housing on or in proximity to said internal surface of said predetermined portion so that the core component couples with said field when the device is in its said power-receiving disposition, the magnetic core component including a thin sheet of magnetic material and also including a coil wound around said sheet for receiving power inductively from the external unit, the sheet and the coil being arranged so that a longitudinal axis of said sheet and a central axis of said coil each extend generally parallel to said field generating surface when the device is in said power-receiving disposition.

2. A portable electrical or electronic device as claimed in claim 1 wherein said thin sheet is substantially flat.

3. A portable electrical or electronic device as claimed in claim 1 wherein said thin sheet is curved.

4. A portable electrical or electronic device as claimed in claim 1 wherein said coil extends in its axial direction over a distance that is large compared to a thickness of said magnetic core component.

5. A portable electrical or electronic device as claimed in claim 1 wherein the largest dimension of said thin sheet is in the direction of said central axis of said coil.

6. A portable electrical or electronic device as claimed in claim 1 wherein said magnetic material is amorphous magnetically permeable material.

7. A portable electrical or electronic device as claimed in claim 1 wherein said magnetic core component has two such coils, the respective central axes of said two coils extending in mutually orthogonal directions generally parallel to said field generating surface when the device is in said power-receiving disposition.

8. A rechargeable battery adapted to receive power inductively from a primary unit when fitted into a space in a portable electrical or electronic device, the device comprising a cover element having a substantially planar portion with inner and outer surfaces and being adapted to be placed with said outer surface on or in proximity to such a primary unit when the battery is to be recharged, and the device being adapted to retain the battery in the space with its longitudinal axis extending generally parallel to a plane of said planar portion, the battery comprising:
- a power-receiving element comprising a coil which is in close proximity to said inner surface of said cover element when the cell is so retained in said space and which has a central axis that extends generally parallel to a plane of said planar portion, for receiving power inductively from the primary unit when the device is so placed on or in proximity to the primary unit; and
- a rechargeable energy-storing element connected to the power-receiving element for storing the power received inductively by the power-receiving element, said power-receiving element in the form of a thin sheet.

9. A rechargeable battery as claimed in claim 8 wherein said thin sheet is substantially flat.

10. A rechargeable battery as claimed in claim 8 wherein said thin sheet is curved.

11. A rechargeable battery as claimed in claim 8 wherein said power-receiving element further comprises a core of magnetic material, said core having a longitudinal axis which extends generally parallel to said plane.

12. A rechargeable battery as claimed in claim 11 wherein said coil is wound about said core.

13. A rechargeable battery as claimed in claim 11 wherein said coil extends in its axial direction over a distance that is large compared to a thickness of said power-receiving element.

14. A rechargeable battery as claimed in claim 11 wherein said core is made of amorphous magnetically permeable material.

15. A rechargeable battery as claimed in claim 8 wherein said power-receiving element has two such coils, the respective central axes of said two coils extending in mutually orthogonal directions generally parallel to said plane.

16. A rechargeable battery as claimed in claim 8 wherein said portable electrical or electronic device has a metal plane extending generally parallel to said plane of said planar portion of said cover element.

17. A rechargeable battery as claimed in claim 8, wherein the portable electrical or electronic device has a printed circuit board extending generally parallel to a plane of said planar portion of said cover element.

18. A rechargeable battery as claimed in claim 8 wherein said planar portion of said cover element includes metal.

19. A rechargeable battery as claimed in claim 11 wherein, when the battery is retained in said space, said core is located between said cover element and components of the device susceptible to electromagnetic fields so that the core can serve to reduce the effects on such components of an electromagnetic field generated by the primary unit.

20. A rechargeable battery as claimed in claim 8 wherein said rechargeable battery further comprises a power conversion unit which converts power received inductively by the power-receiving element into a form suitable for delivery to outside said battery through external electrical connections thereof, or into a form suitable for recharging the energy-storing element, or into both said forms.

21. A rechargeable battery as claimed in claim 20 wherein said rechargeable battery has a charge-control unit operable, when the power-receiving element is receiving power inductively, to meter the supply of inductively-received power to the external electrical connections and to the energy-storing element.

22. A rechargeable battery as claimed in claim 8 having an enclosure and external electrical connections similar in dimensions to an industry-standard battery.

23. A rechargeable battery adapted to receive power inductively from a primary unit when fitted into a space in a portable electrical or electronic device, the device comprising a cover element having a substantially planar portion with inner and outer surfaces and being adapted to be placed with said outer surface on or in proximity to such a primary unit when the battery is to be recharged, and the device being adapted to retain the battery in the space with its longitudinal axis extending generally parallel to a plane of said planar portion, the battery comprising:
- a power-receiving element comprising a coil which is in close proximity to said inner surface of said cover element when the cell is so retained in said space and which has a central axis that extends generally parallel to a plane of said planar portion, for receiving power inductively from the primary unit when the device is so placed on or in proximity to the primary unit; and
- a rechargeable energy-storing element connected to the power-receiving element for storing the power received inductively by the power-receiving element; wherein a thickness of said power-receiving element, measured in a direction perpendicular to said plane, is small relative to the dimensions of the power-receiving element parallel to said plane.

24. A rechargeable battery adapted to receive power inductively from a primary unit, the battery comprising:
- a generally cylindrical body having a central axis;
- a power-receiving element, comprising a coil having a central axis extending generally in parallel with said central axis of said body, for receiving power inductively from the primary unit when the battery is placed on or in proximity to a power transfer surface of the primary unit with said central axis of said body lying across the surface; and
- a rechargeable energy-storing element connected to said power-receiving element for storing the power received inductively by the power-receiving element;
- wherein said power-receiving element is in the form of a thin sheet.

25. A rechargeable battery as claimed in claim 24 wherein said thin sheet is curved.

26. A rechargeable battery as claimed in claim 24 wherein said thin sheet is wrapped circumferentially around said body or around another generally cylindrical component of the battery.

27. A rechargeable battery as claimed in claim 24 wherein said power-receiving element further comprises a core of magnetic material, said core having a longitudinal axis which extends generally parallel to said central axis of said body.

28. A rechargeable battery as claimed in claim 27 wherein said coil is wound about said core.

29. A rechargeable battery as claimed in claim 27 wherein said coil extends in its axial direction over a distance that is large compared to a thickness of said power-receiving element.

30. A rechargeable battery as claimed in claim 27 wherein said core is made of amorphous magnetically permeable material.

31. A rechargeable battery as claimed in claim 24 wherein said rechargeable battery further comprises a power conversion unit which converts power received inductively by the power-receiving element into a form suitable for delivery to outside said battery through external electrical connections thereof, or into a form suitable for recharging the energy-storing element, or into both said forms.

32. A rechargeable battery as claimed in claim 24 wherein said rechargeable battery has a charge-control unit operable, when the power-receiving element is receiving power inductively, to meter the supply of inductively-received power to the external electrical connections and to the energy-storing element.

33. A rechargeable battery as claimed in claim 24 having an enclosure and external electrical connections similar in dimensions to an industry-standard battery.

\* \* \* \* \*